US012651395B2

(12) United States Patent

Bagley

(10) Patent No.: US 12,651,395 B2

(45) Date of Patent: Jun. 9, 2026

(54) TRACKED ARM POSITION IN VIRTUAL REALITY MULTIUSER APPLICATION

(71) Applicant: VRChat Inc., San Francisco, CA (US)

(72) Inventor: Benjamin Bagley, Maebashi (JP)

(73) Assignee: VRCHAT INC., San Francisco, CA (US)

( * ) Notice: Subject to any disclaimer, the term of this patent is extended or adjusted under 35 U.S.C. 154(b) by 185 days.

(21) Appl. No.: 18/180,954

(22) Filed: Mar. 9, 2023

(65) Prior Publication Data

US 2024/0303893 A1      Sep. 12, 2024

(51) Int. Cl.
*G06T 13/40* (2011.01)
*G06F 3/01* (2006.01)

(52) U.S. Cl.
CPC .............. *G06T 13/40* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 12,524,977 B2 * | 1/2026 | Sundstrom | .............. G06T 19/20 |
| 2001/0000779 A1 * | 5/2001 | Hayama | .................. A63F 13/52 |
| | | | 463/30 |
| 2013/0307850 A1 * | 11/2013 | Mukai | ..................... G06T 13/40 |
| | | | 345/420 |

| | | | |
|---|---|---|---|
| 2017/0003738 A1 * | 1/2017 | Silkin | ................... A63F 13/214 |
| 2018/0144531 A1 * | 5/2018 | Aguado | .................. G06T 13/40 |
| 2019/0087068 A1 * | 3/2019 | Noguchi | ................. G06F 1/163 |
| 2020/0226811 A1 * | 7/2020 | Kim | ......................... A63F 13/55 |
| 2020/0272228 A1 * | 8/2020 | Ding | ......................... G06T 7/70 |
| 2020/0364919 A1 * | 11/2020 | Saito | ......................... G06T 7/70 |
| 2021/0349529 A1 * | 11/2021 | Winold | ................ A61B 5/1124 |
| 2022/0035443 A1 * | 2/2022 | Winold | .................. G06V 20/20 |
| 2023/0023609 A1 * | 1/2023 | Winold | .............. A63B 71/0622 |
| 2024/0265607 A1 * | 8/2024 | Li | ............................. G06F 3/011 |
| 2024/0378784 A1 * | 11/2024 | Xu | ........................... G06T 19/00 |
| 2025/0069315 A1 * | 2/2025 | Cho | ......................... G06T 7/11 |

FOREIGN PATENT DOCUMENTS

| | | | | | |
|---|---|---|---|---|---|
| CN | 114519758 | * | 5/2022 | ............ | G06T 13/40 |
| CN | 114821009 | * | 7/2022 | ............ | G06T 19/20 |
| CN | 114821009 A | * | 7/2022 | ............ | G06T 19/20 |

* cited by examiner

*Primary Examiner* — Andrew G Yang

(74) *Attorney, Agent, or Firm* — Polsinelli PC

(57) ABSTRACT

The present technology pertains to full body or partial body tracking in a multiuser extended reality (XR) application. In one aspect, a client device that is participating in the multiuser XR application and may be configured to determine a position of a first elbow associated with an arm of an avatar in the virtual world based on at least a position associated with a wrist or hand of a user; determine whether the position of the elbow is inside a boundary associated with an opposing shoulder; adjust the position of the elbow to be outside of the boundary associated with the opposing shoulder; and render the arm of the avatar based on the position of the elbow outside of the boundary. Additional aspects include compound motion tracking and rendering of a shoulder in an XR application.

22 Claims, 15 Drawing Sheets

300

600

602        604        606        608

800

800 regions

1200 —

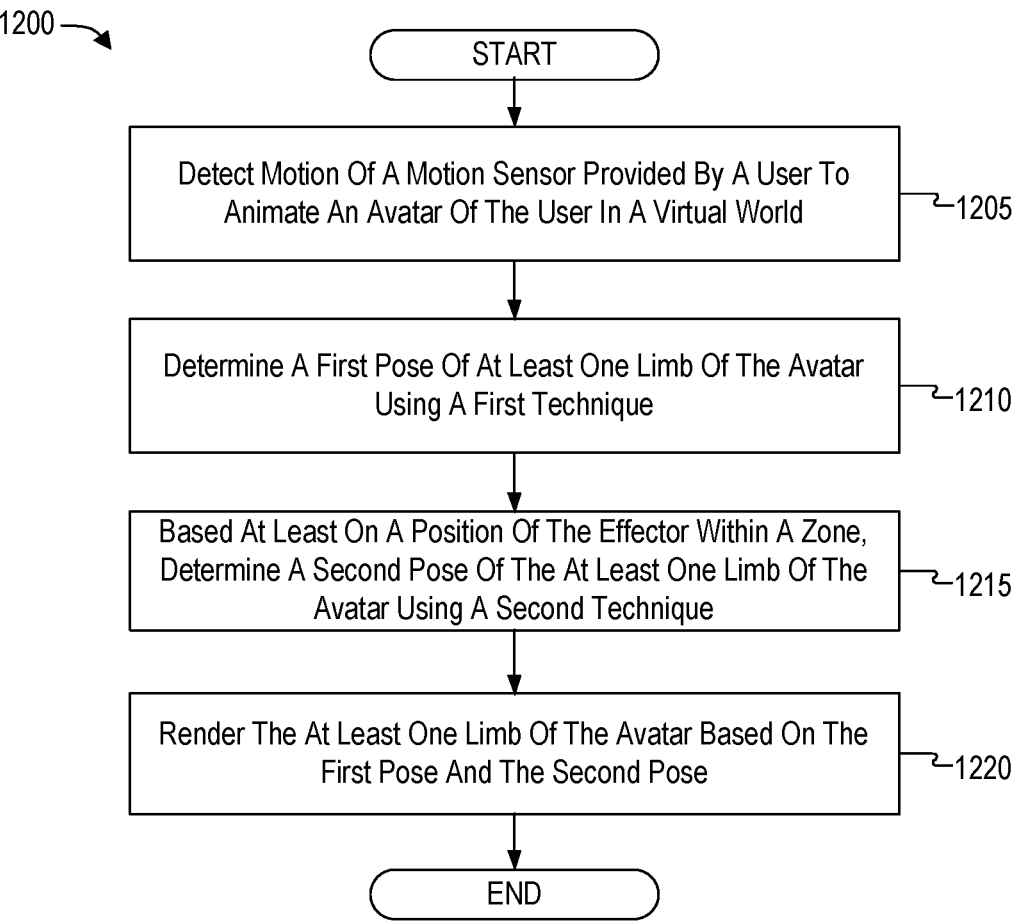

START

Detect Motion Of A Motion Sensor Provided By A User To Animate An Avatar Of The User In A Virtual World ⟶ 1205

Determine A First Pose Of At Least One Limb Of The Avatar Using A First Technique ⟶ 1210

Based At Least On A Position Of The Effector Within A Zone, Determine A Second Pose Of The At Least One Limb Of The Avatar Using A Second Technique ⟶ 1215

Render The At Least One Limb Of The Avatar Based On The First Pose And The Second Pose ⟶ 1220

END

FIG. 12

TRACKED ARM POSITION IN VIRTUAL REALITY MULTIUSER APPLICATION

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be the shape of the shoulders and a head without any distinguishing features. Some avatars can be complex and can be associated with detailed graphics, and textures, and can be capable of various animations. For example, some avatars include a number of portions that are separately animated for realistic or non-realistic motion, e.g. hair, tails, ears, clothing, etc. In some cases, a multiuser virtual reality application can have hundreds of avatars and corresponding client devices interacting within that environment.

SUMMARY

In some examples, systems and techniques are described for tracking motion and mapping motion into a virtual world. The systems and techniques can improve the tracking of motion in the physical world and map that motion into the virtual world to improve visual fidelity and the immersive experience.

According to at least one example, a method is provided for tracking motion used in an extended reality application. The method includes: determining a position of a first elbow associated with an arm of an avatar in the virtual world based on at least a position associated with a wrist or hand of a user; determining whether the position of the elbow is inside a boundary associated with an opposing shoulder; adjusting the position of the elbow to be outside of the boundary associated with the opposing shoulder; and rendering the arm of the avatar based on the position of the elbow outside of the boundary.

In another example, an apparatus for tracking motion used in an extended reality application is provided that includes at least one memory and at least one processor coupled to the at least one memory. The at least one processor is configured to: determine a position of a first elbow associated with an arm of an avatar in the virtual world based on at least a position associated with a wrist or hand of a user; determine whether the position of the elbow is inside a boundary associated with an opposing shoulder; adjust the position of the elbow to be outside of the boundary associated with the opposing shoulder; and render the arm of the avatar based on the position of the elbow outside of the boundary.

In another example, a non-transitory computer-readable medium is provided that has stored thereon instructions that, when executed by one or more processors, cause the one or more processors to: determine a position of a first elbow associated with an arm of an avatar in the virtual world based on at least a position associated with a wrist or hand of a user; determining whether the position of the elbow is inside a boundary associated with an opposing shoulder; adjust the position of the elbow to be outside of the boundary associated with the opposing shoulder; and render the arm of the avatar based on the position of the elbow outside of the boundary.

In another example, an apparatus for tracking motion used in an extended reality application. The apparatus includes: means for determining a position of a first elbow associated with an arm of an avatar in the virtual world based on at least a position associated with a wrist or hand of a user; means for determining whether the position of the elbow is inside a boundary associated with an opposing shoulder; means for adjusting the position of the elbow to be outside of the boundary associated with the opposing shoulder; and means for rendering the arm of the avatar based on the position of the elbow outside of the boundary.

According to at least one example, a method is provided for tracking motion used in an extended reality application based on compound motion. The method includes: receiving motion data from a motion sensor associated with a wrist of the user; determining a motion sensor associated with a wrist of the user has moved to a first position that is within a zone that is associated with a shoulder of an arm; determining a first pose of the arm based on the first position; and rendering the arm in a second pose, wherein the second pose of the arm is based on the first pose of the arm and the first position within the zone associated with the shoulder of the arm.

In another example, an apparatus for tracking motion used in an extended reality application is provided that includes at least one memory and at least one processor coupled to the at least one memory. The at least one processor is configured to: receive motion data from a motion sensor associated with a wrist of the user; determine a motion sensor associated with a wrist of the user has moved to a first position that is within a zone that is associated with a shoulder of an arm; determine a first pose of the arm based on the first position; and render the arm in a second pose, wherein the second pose of the arm is based on the first pose of the arm and the first position within the zone associated with the shoulder of the arm.

In another example, a non-transitory computer-readable medium is provided that has stored thereon instructions that, when executed by one or more processors, cause the one or more processors to: receive motion data from a motion sensor associated with a wrist of the user; determine a motion sensor associated with a wrist of the user has moved to a first position that is within a zone that is associated with a shoulder of an arm; determine a first pose of the arm based on the first position; and render the arm in a second pose, wherein the second pose of the arm is based on the first pose of the arm and the first position within the zone associated with the shoulder of the arm.

In another example, an apparatus for tracking motion used in an extended reality application is provided. The apparatus includes: means for receiving motion data from a motion sensor associated with a wrist of the user; means for determining a motion sensor associated with a wrist of the user has moved to a first position that is within a zone that is associated with a shoulder of an arm; means for determining a first pose of the arm based on the first position; and means for rendering the arm in a second pose, wherein the second pose of the arm is based on the first pose of the arm and the first position within the zone associated with the shoulder of the arm.

According to at least one example, a method is provided for tracking motion used in an extended reality application using a hybrid inverse kinematic (IK) technique. The method includes: detecting motion of a motion sensor provided by a user to animate an avatar of the user in a virtual world, wherein the motion sensor is associated with an effector that binds motion information from the motion sensor into the virtual world; determining a first pose of at least one limb of the avatar using a first technique; based at least on a position of the effector within a zone, determining a second pose of the at least one limb of the avatar using a second technique; and rendering the at least one limb of the avatar based on the first pose and the second pose.

In another example, an apparatus for tracking motion used in an extended reality application is provided that includes at least one memory and at least one processor coupled to the at least one memory. The at least one processor is configured to: detect motion of a motion sensor provided by a user to animate an avatar of the user in a virtual world, wherein the motion sensor is associated with an effector that binds motion information from the motion sensor into the virtual world; determine a first pose of at least one limb of the avatar using a first technique; based at least on a position of the effector within a zone, determine a second pose of the at least one limb of the avatar using a second technique; and render the at least one limb of the avatar based on the first pose and the second pose.

In another example, a non-transitory computer-readable medium is provided that has stored thereon instructions that, when executed by one or more processors, cause the one or more processors to: detect motion of a motion sensor provided by a user to animate an avatar of the user in a virtual world, wherein the motion sensor is associated with an effector that binds motion information from the motion sensor into the virtual world; determine a first pose of at least one limb of the avatar using a first technique; based at least on a position of the effector within a zone, determine a second pose of the at least one limb of the avatar using a second technique; and render the at least one limb of the avatar based on the first pose and the second pose.

In another example, an apparatus for tracking motion and mapping motion used in an extended reality application is provided. The apparatus includes: means for detecting motion of a motion sensor provided by a user to animate an avatar of the user in a virtual world, wherein the motion sensor is associated with an effector that binds motion information from the motion sensor into the virtual world; means for determining a first pose of at least one limb of the avatar using a first technique; based at least on a position of the effector within a zone, means for determining a second pose of the at least one limb of the avatar using a second technique; and means for rendering the at least one limb of the avatar based on the first pose and the second pose.

In some aspects, one or more of the apparatuses described herein is, is part of, and/or includes a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a vehicle or a computing system, device, or component of a vehicle, a wearable device (e.g., a network-connected watch or other wearable device), a wireless communication device, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

To easily identify the discussion of any particular element or act, the most significant digit or digits in a reference number refer to the figure number in which that element is first introduced.

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 12 illustrates another example method for tracking and rendering motion within a virtual world in accordance with some aspects of the disclosure.

DETAILED DESCRIPTION

Figure 1:
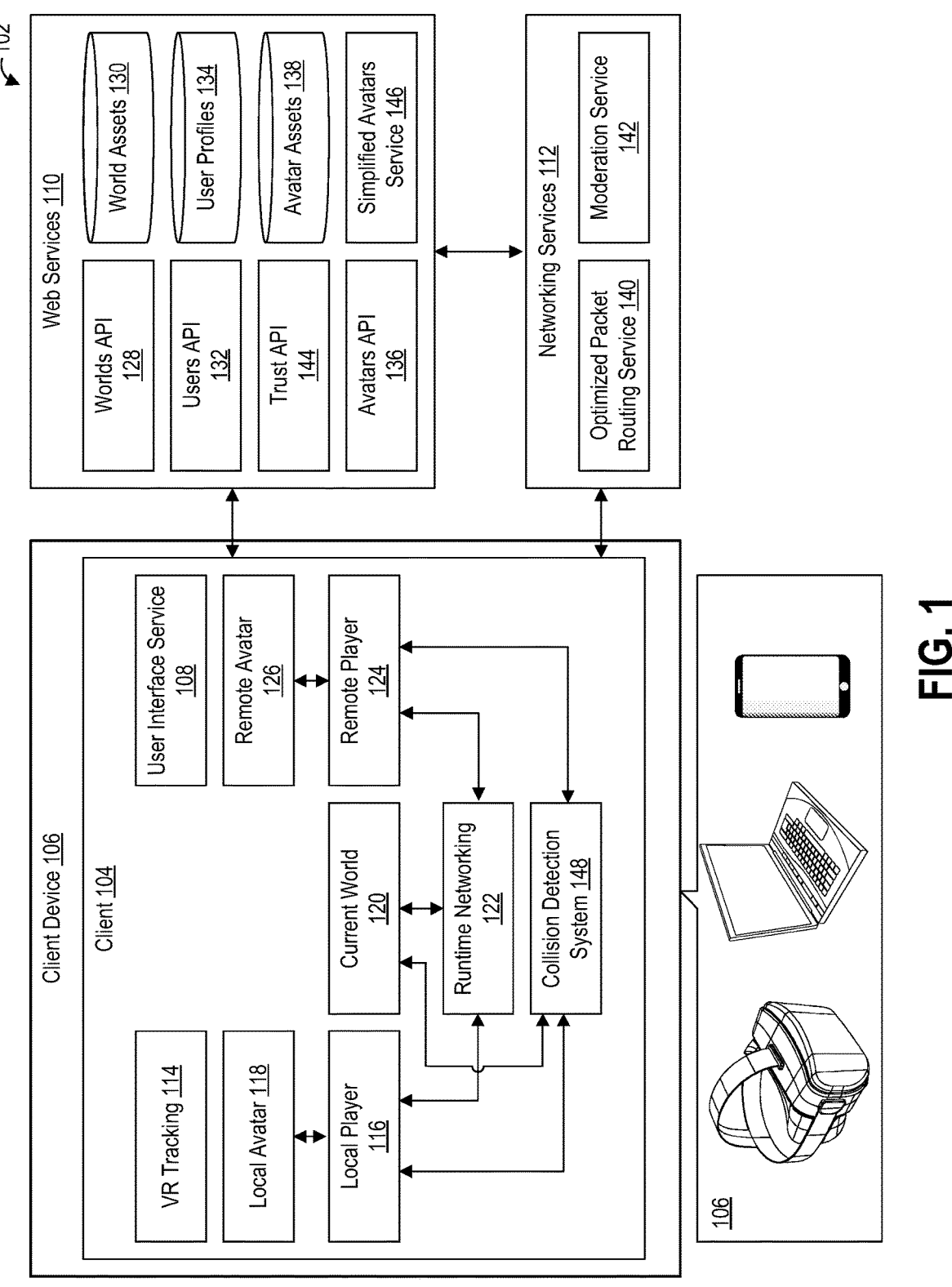
FIG. 1 illustrates an example virtual world platform for playing and hosting a multiplayer virtual reality (VR) experience in accordance with some aspects of the present technology.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Interactions between users in virtual worlds such as those hosted by some virtual reality (VR) platforms continue to evolve. Initially, interactions were limited to co-existing in the same world and playing a game together. Interactions progressed to live communications, and then to attending virtual events together. Recently, users have begun to increase the range of motion of their avatars to interact within these virtual worlds and with objects within the virtual world. For example, characters within the virtual world are now able to exercise or dance at a nightclub in virtual worlds, and various contact-based interactions between characters can occur and trigger events that occur within the virtual world.

Virtual worlds are three dimensional (3D) spaces that can have a range of interactions including interactions within the environment and interactions with other avatars. In some cases, interaction within the environment can be performed with an input controller, which provides an interface to interact with the environment. A game controller can be a type of input controller, and an input controller can also include a VR controller that may provide data to identify a point in space where the VR controller is physically positioned. For example, a VR controller can be used to identify a point in space and an orientation of the VR controller.

Virtual worlds may implement inverse kinematics (IK), which is the mathematical process of calculating the variable joint parameters needed to place the end of a kinematic chain, such as a robot manipulator or animation character's skeleton, in a given position and orientation relative to the start of the chain. IK can be used to determine a position of various aspects of a virtual world, such as a location of a player's arm within the virtual world.

Using a VR controller or another conventional input controller can only provide a limited range of input within the virtual world and IK alone cannot accurately determine a position of corresponding body parts of avatars within the virtual world. For example, IK may accurately determine position of a wrist that corresponds to a VR controller's location in space, but IK may not accurately determine a position of the elbow due to a position of the person's shoulder, which is capable of multiple types of movement within physical space.

Some virtual worlds can support more complex interactions based on using full-body or partial body tracking, which can be accomplished using various techniques. One technique is using a number of motion sensors, such as inertia measurement units (IMUs) that are positioned at various locations on the body, which is referred to as inside-out tracking. Other examples of motion sensors include cameras, photodiodes, gyrometers, accelerometers, time of flight (ToF) sensors, and so forth. One type of body tracking using motion sensors is inside-out tracking, which refers to using sensors attached to a person to track their movement and position. Another technique of body tracking is using a full-body tracking suit with objects that are tracked using an external system, which is referred to as outside-in tracking. Outside-in tracking refers to using an external sensor system that identifies the movement and position of the tracked subject. Another technique of full-body tracking is attaching objects to the body that are tracked using an external system such as suits, straps, or other attachment methods.

Complex movements in the virtual world can be accomplished with full body tracking that requires a number of motion sensors to track the positions of shoulders, elbows, hips, feet, and knees. However, motion in the physical world is difficult to track because motion is tracked using external devices that do not directly identify different types of movement (e.g., cartesian, rotational, etc.). Further, motion is not necessarily directly translatable into a virtual world because of differences in proportions, sizes, and differences between a virtual avatar and a human person. For example, a virtual avatar can be a robot that has proportions that are different than the proportions of a person. In another example, the virtual avatar may be a dinosaur that has fundamentally different anatomical proportions than a person.

One example of complex movement is elbow positioning in conventional IK solutions, which solve for the position of the elbow based on a position of the wrist. Existing IK solutions can cause clipping of the avatar in some cases, such as when a hand moves across a center line of the body to the opposite side. Existing IK solutions may use a physics collider that prevents collisions with the body and pushes the elbow away based on a radius, which creates a bouncy rigid elbow that appears unnatural. In some cases, the physics collider can cause the elbow to be stuck in a position across the center line and effectively disables tracking of motion of the arm. Another example of complex movement is shoulder positioning while the arm is folded (e.g., biased), which affects shoulder movement. In some cases, users may prefer multiple IK solutions for different poses and may prefer a hybrid solution to fully express their desired movement within the virtual world.

The present disclosure describes systems, apparatuses, methods, and computer-readable media (collectively referred to as "systems and techniques") for tracking and rendering motion within a virtual world. For example, an aspect of the present technology relates to rendering an elbow within a virtual world based on a non-linear (e.g., a circumferential) boundary. In some cases, the systems and techniques can determine that a position of an elbow is inside a boundary associated with an opposing shoulder. For example, the boundary can be semicircle that is positioned at the shoulder joint or substantially close to the shoulder joint and motion may be detected based on a motion sensor that crosses the boundary. In this case, the systems and techniques can adjust the position of the elbow to be outside of the boundary based on rotating the motion vector from its origination point. In this case, as the elbow moves across the body, the elbow is also pushed away from the body to smooth the motion, which creates a stable elbow position that is unable to be placed in an impossible location and limits clipping.

Another aspect of the present technology relates to rendering the arm and shoulder based on an inward folded elbow. In some cases, the systems and techniques can determine the motion of the user places the wrist within a zone of the shoulder. For example, the elbow is folded inwards to move the wrist near the shoulder. The systems and techniques can determine a position of the arm based on the wrist being inside of the zone. In some cases, the position may not be possible without further rotating the arm into an impossible position. The systems and techniques can determine a second position of the arm based on the wrist being located within the zone. In one aspect, the second position of the arm can be modified based on rotating a shoulder bone of an avatar, which may cause the arm to render in an anatomically correct position. In this case, the zone correlates movement of the wrist to movement of the shoulder and enables accurate tracking of the shoulder, wrist, and elbow while the arm is folded inwards.

Another aspect of the present technology relates to hybrid use of IK solutions. In some cases, the systems and techniques can detect motion of a motion sensor provided by a user to animate an avatar of the user in a virtual world, and the motion sensor is associated with an effector that binds motion information from the motion sensor into the virtual world. For example, the effector can be a motion sensor that is used to identify motion of a joint or a bone of the user. The systems and techniques can determine a first pose associated with a limb using a first technique. When the effector is located within a zone (e.g., a hip zone), the systems and techniques can determine a second pose of the at least one limb of the avatar using a second technique. Based on the position of the effector within the zone, the systems and techniques can render the limb based on the first pose and the second pose. For example, the systems and techniques can interpolate the position based on a blend factor that is determined based on the position of the effector within the zone. In some cases, the application of the hybrid IK solution may be dependent on a directional mode. The direction mode is associated with whether the motion sensor is positioned in front or behind a chest vector and whether the motion sensor is precluded from switching zones based on a location of motion sensor.

FIG. 1 illustrates an example virtual world platform 102 for playing and hosting a multiplayer VR experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally store and provide long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first-person inputs from a user of the client device 106 upon which client 104 is executing and handles third-party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends list, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of the client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client 104 can download an instance of the virtual world by calling the worlds API 128, which can retrieve the virtual world from world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics. In some aspects the avatar assets include colliders and receivers defined on portions of the avatar, or a tree of transforms that cause portions of the avatar to exhibit secondary motion behaviors (e.g., dynamic or physics bones (aka phys. bones) are examples systems that can configure portions of the avatar to exhibit secondary motion behaviors).

The downloaded instance of the virtual world can be executed by client 104 as a current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The client 104 can also support contact interactions between avatars, a portion of an avatar with another portion of the same avatar, or a portion of an avatar with an object in a virtual world. In order to detect these interactions, the client 104 can be configured to detect collisions between objects using the collision detection system 148. In some embodiments, the collision detection system 148 can be a broad phase collision detection system.

The current world 120 also has features that require networking. The current world 120 could have objects that a user can interact with and dynamically change aspects of the current world 120, and the object needs to broadcast its state across the network so that other users in the current world 120 can view the current state of the object. In one illustrative example, the current world 120 can include a light switch that dynamically affects a light source within the current world 120, such as turning on or off the light.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking service such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual world platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports 3D environments. Two common game engines include UNITY and UNREAL ENGINE.

In some embodiments, to be supported by virtual world platform 102, virtual worlds and complex avatars need to be developed in compliance with a SDK. For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Various aspects relate to tracking motion and rendering that motion in high fidelity in a virtual world environment. As described above, there are numerous potential issues with tracking motion and providing a high-fidelity experience when using full body tracking or partial body tracking. Creating an engaging experience is needed for users to understand complex motions, non-verbal communications (e.g., shoulder shrugs, etc.), and other important physical cues. Expressiveness is an important aspect for virtual worlds to ensure that users (or players) have a high-quality experience and can use the functionality of virtual worlds for their purpose, whether recreational or commercial.

Figure 2:
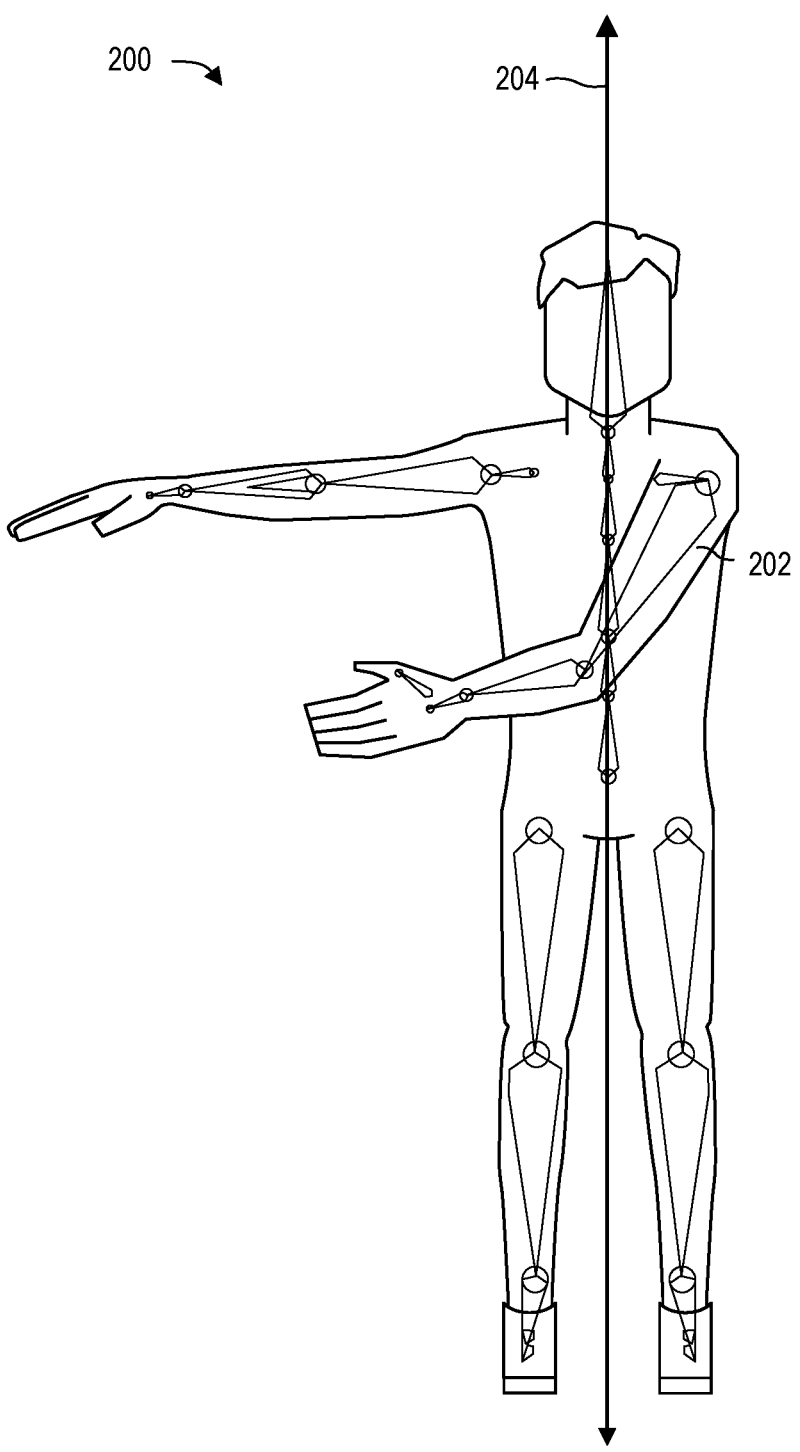
FIG. 2 illustrates an example rendering of an animation of an avatar that is clipped based on motion from a motion sensor in accordance with some aspects of the disclosure.

FIG. 2 illustrates an example rendering of an animation of an avatar 200 that is clipped based on motion from a motion sensor in accordance with some aspects of the disclosure. In one aspect, the person is using a VR controller to track motion input of their arms, which is mapped from the physical world into a virtual world based on various differences. Examples of differences in the real world include physical size (e.g., height of the user as compared to the height of the avatar), sensor calibration offsets (e.g., a distance from a sensor to a joint the sensor may be used to model), and so forth.

In the example of FIG. 2, a left arm 202 of the avatar 200 crosses a centerline 204 to enter a right side of the avatar. Because the avatar 200 is a rigid fixed model in 3D, the left arm 202 of the avatar intersects the left side of the torso of the avatar 200 and clips the left arm 202. Clipping of the left arm 202 lowers the fidelity of the user experience because in the physical world a person's body is not a rigid and inflexible solid. By contrast, the avatar 200 is a semi-rigid body with limbs that can be positioned, and other objects can move (e.g., the hair of the avatar 200). However, aspects of the avatar 200 are rigid, which causes the left arm 202 to intersect the torso of the avatar 200 in 3D space when the left arm 202 moves into an opposing side as illustrated in FIG. 2. In this case, the clipping can occur because the elbow is too close to the rigid torso.

In some cases, the elbow of the avatar 200 is pushed away from the body using a physics collider. This can result in unnatural animations that lower the fidelity of the experience. For example, the physics collider can cause the elbow to bounce in space in an unrealistic manner and may eventually cause the elbow to be positioned on an opposite side in a stuck position. In some cases, a stuck elbow on an opposite side of the body in the virtual world can be difficult to correct because the motion sensor may use relative motion to determine its place relative to the body.

An aspect of the disclosure uses a boundary condition that moves the elbow based on a non-linear boundary that corrects motion of the elbow along the non-linear boundary when motion crosses the boundary condition. In one illustrative example, the systems and techniques may be configured to smooth motion of the elbow by redirecting the motion to be tangential to the boundary condition. For example, the systems and techniques can include an extended reality (XR) multiuser application that is executing on a computing system such as the computing system 1300 in FIG. 13.

Figure 3:
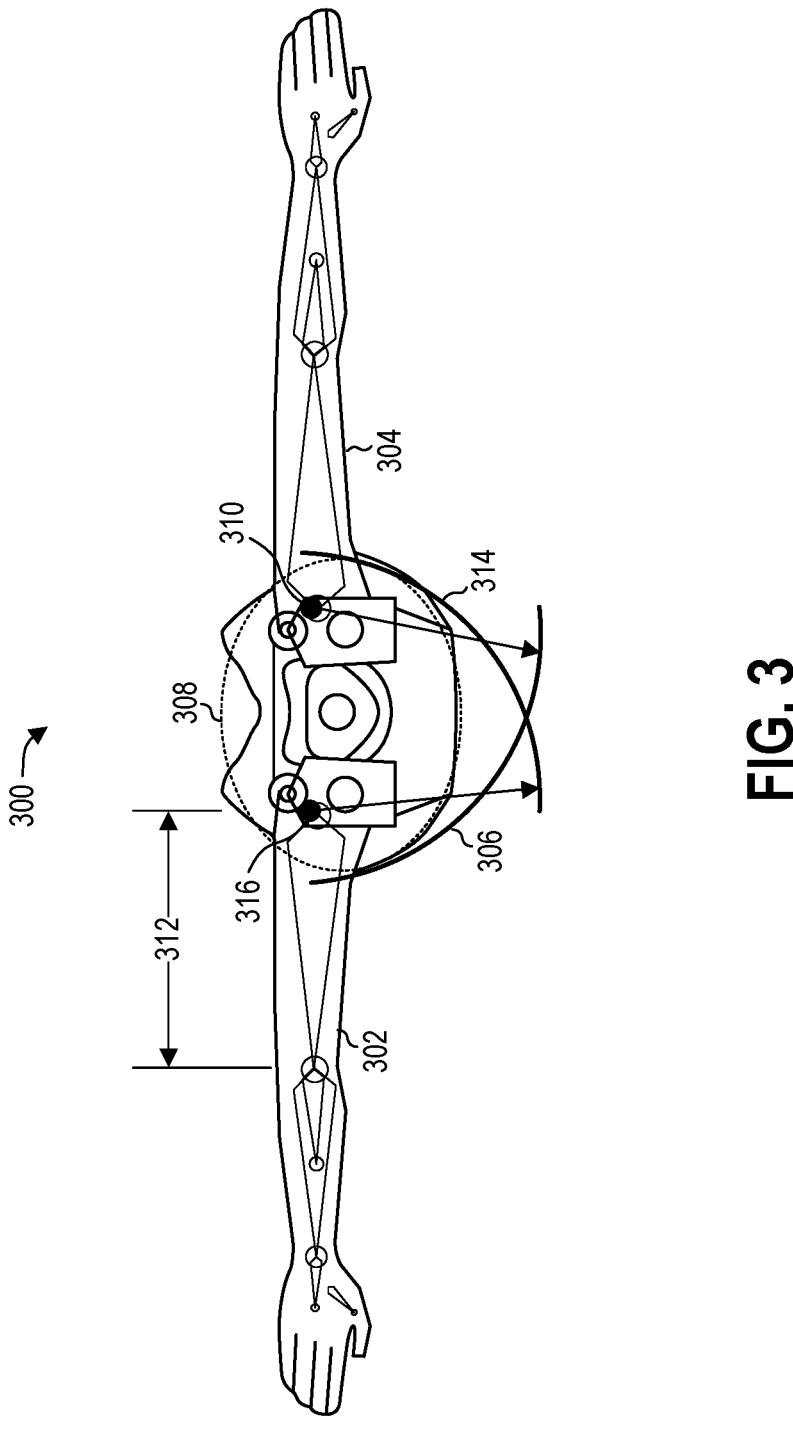
FIG. 3 illustrates an example of a boundary condition of an elbow in accordance with some aspects of the disclosure.

FIG. 3 illustrates an example of a boundary condition of an elbow in accordance with some aspects of the disclosure. In particular, FIG. 3 depicts a top view of an avatar 300 in a T-pose with right arm 302 and left arm 304 being held on a line parallel to the ground.

Figure 4:
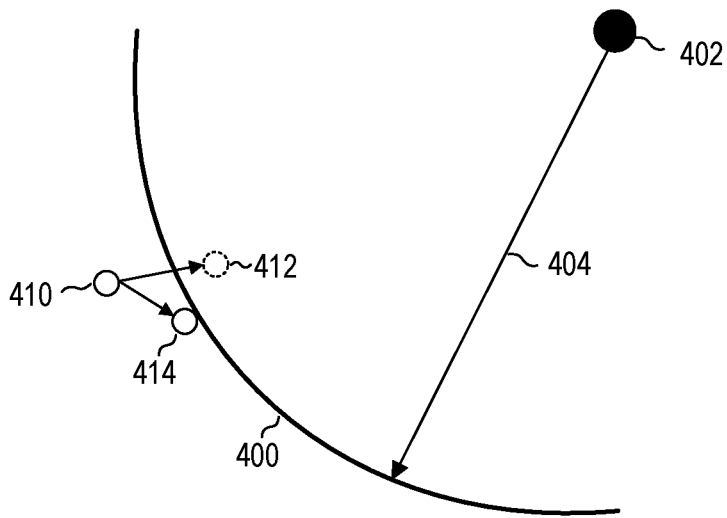
FIG. 4 is a graph illustrating readjustment of a joint of a limb based on a boundary condition 400 in accordance with some aspects of the disclosure.

A right arm boundary condition 306 is illustrated as an arc and is configured to smooth motion of the right arm 302 by remapping motion along the right arm boundary condition 306. For example, as illustrated in FIG. 4, if an elbow position is determined to cross the right arm boundary condition 306 based on an IK solution, the systems and techniques are configured to remap the elbow position to be tangential to the right arm boundary condition 306. For example, the systems and techniques may rotate the elbow position on at least one axis to prevent the elbow from entering into a torso region 308. In some aspects, the rotation of the motion can map the elbow position to be tangential to the boundary condition 306.

In some aspects the remapped motion is different than existing physics collider effects, which apply a force to repel an object from the collision area. For example, a physics collider effect can apply a force that is normal to the object to prevent the object from entering a single, common area that is associated with a rigid body. A single, common exclusion area provides an invisible barrier that abruptly stops motion and appears unnatural. According to aspects of the disclosure, because each elbow sees a different arc of exclusion associated with the opposite shoulder, there is no common invisible barrier which causes the motion of the elbows to appear more natural when compared to a simple physics collider. For example, the left elbow may enter an area that the right elbow is excluded from entering.

In some aspects, the right arm boundary condition 306 is configured to map motion along its circumference to create a smooth animation across different frames that appear natural and realistic. In addition, the right arm boundary condition 306 pushes the elbow position away from the body, which accurately models elbow mobility in the physical world. A detailed illustration of mapping motion along the right arm boundary condition 306 is further described in FIG. 4.

In some aspects, the right arm boundary condition 306 is positioned based on an opposing shoulder. For example, the right arm boundary condition 306 may be a circle or a semicircle that is centered at a left shoulder position, such as the left shoulder joint 310. In some aspects, the right arm boundary condition 306 may be any other suitable shape, such as an ellipse or an arc (e.g., a portion of an ellipse). In the case of an elliptical shape such as an arc, at least one radius of the elliptical shape may be positioned proximate to the opposing shoulder.

In some aspects, the radius of the right arm boundary condition 306 is configured to correspond to a length of the humerus bone 312, which causes the elbow to always be pushed away from the torso region. In this case, the elbow is always pushed away as the arm rotates past the center line and prevents the elbow from being placed into a region that can cause the elbow to be stuck. The right arm boundary condition 306 guides the IK solution to correctly position the elbow and prevent impossible positions that may occur due to motion controller drift, and other parasitic effects. In other aspects, the radius of the right arm boundary condition 306 can be based on other factors, such as a distance between the shoulder joints. In some aspects, although the right arm boundary condition 306 is described as a two dimensional (2D) boundary condition, the right arm boundary condition

306 may also be 3D boundary condition, such as a sphere that affects the positioning of the elbow within a 3D coordinate system.

The avatar also includes a left arm boundary condition 314 that is similar to the right arm boundary condition 306 but is positioned at the opposing shoulder, or the right shoulder joint 316. Similar to the right arm boundary condition 306, the left arm boundary condition 314 causes motions of the elbow to push away from the body as the elbow moves towards a center line of the body. In addition, the right arm boundary condition 306 and the left arm boundary condition 314 also prevent the elbow from being placed in a position that would cause the elbow to be stuck.

The above examples describe a boundary condition for an elbow to smooth motion within a virtual world, and the disclosure is not limited. The above concepts may be applied to other types of motion that would benefit from smoothing motion within IK or other rendering techniques. For example, the boundary condition may be applicable to the knee joints.

FIG. 4 is a graph illustrating the readjustment of a joint of a limb based on a boundary condition 400 in accordance with some aspects of the disclosure. In this aspect, the boundary condition 400 is a semicircle having a center point 402 that is associated with a joint or other anatomical feature (e.g., a shoulder, a hip, etc.). The boundary condition 400 has a radius 404 associated with a body feature (e.g., length of the humerus bone, etc.). In some cases, the radius 404 may be decoupled from body features based on unrealistic anatomical proportions of an avatar (e.g., a dinosaur avatar).

In this case, a joint is located at point 410, and motion is detected to move towards point 412 and intersect the boundary condition 400. In this case, the final position of the joint would be inside the boundary condition 400. The systems and techniques are configured to remap the motion based on the motion vector to be tangential to the boundary condition 400. For example, the systems and techniques are configured to remap the motion based on the motion vector to be tangential to the boundary condition 400 and end the motion at point 414. As described above, the remapping of motion to follow the boundary condition 400 smooths the lateral rotation of the joint as it moves from point 410 toward point 414, thereby increasing visual fidelity of the animation of the avatar based on motion in the physical world and other parasitic effects. An example of a parasitic effect includes drift that causes the motion sensor to be offset from an original position.

In this illustrated aspect, the motion from point 410 to point 414 may be across a single frame or a plurality of frames based on the fidelity of the motion sensors, motion detection engines, and other software and hardware functions within the pipeline to detect and map motion from the physical world into the virtual world.

Figure 5:
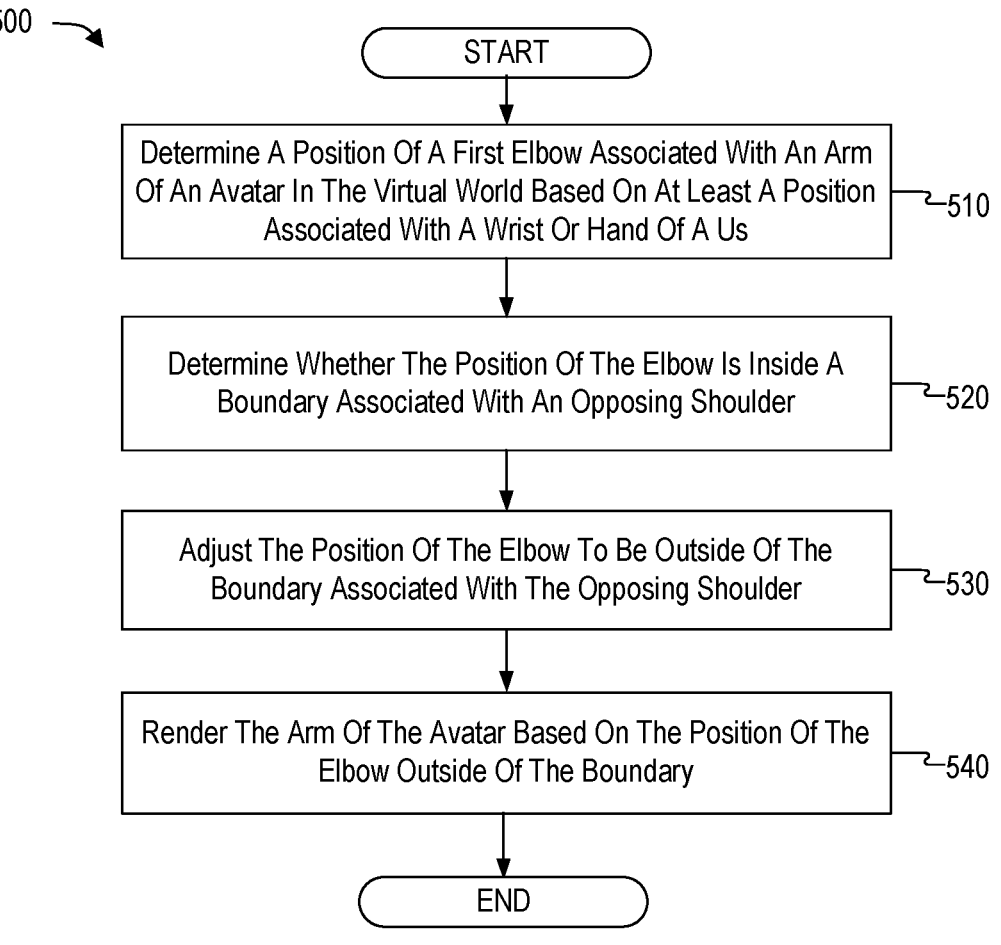
FIG. 5 illustrates an example method for tracking and rendering motion within a virtual world in accordance with some aspects of the disclosure.

FIG. 5 illustrates an example method 500 for tracking and rendering motion within a virtual world in accordance with some aspects of the disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

The method 500 may be performed by a software application executing on a hardware device, which can also be referred to as an XR device that provides VR or augmented reality (AR) content. For example, the software application may be an XR multiuser application that is executing on a head mounted device (HMD), such as a VR headset, or AR glasses. In other aspects, the software application may be executed on a host computer and provided to the XR device. The software application may also be executed on a mobile device, or another device that includes a computing system (e.g., computing system 1300) and is capable of rendering graphics and either displaying the graphics or providing the graphics to another device to display. Based on the input motion using a controller such as an XR controller, the HMD device may be configured to render the motion of an avatar within the XR multiuser application and display the motion to the wearer.

According to various aspects, the method 500 is executed by an XR device and receives data from at least one motion sensor, and determines a position of a first elbow associated with an arm of an avatar in the virtual world based on at least a position associated with a wrist or hand of a user at block 510.

The XR device may be configured to determine whether the position of the elbow is inside a boundary associated with an opposing shoulder at block 520. In one aspect, the determining of whether the position of the elbow is inside a boundary associated with an opposing shoulder. For example, as described above, the boundary condition of a right shoulder may be associated with a non-linear region that is based on an opposing circle, such as circular region that is centered at the left shoulder. In some aspects, the boundary comprises a non-linear region that is associated with the opposing shoulder. In one example, the boundary (or boundary condition) and may be a circle having one radius. In another example, the non-linear region may be an ellipse having two radii.

According to some aspects, the XR device may adjust the position of the elbow to be outside of the boundary associated with the opposing shoulder at block 530. The adjusting of the position comprises calculating the position of the elbow to follow the boundary. For example, the position can be calculated based on a movement vector of the elbow, of the movement vector of the elbow can be rotated in 2D or 3D coordinates to be tangential to the boundary.

According to some examples, the XR device may render the arm of the avatar based on the position of the elbow outside of the boundary at block 540.

As described above, rendering the motion of an arm based on motion input from a VR controller may clip the solid regions or render an elbow that is unnaturally jumping to different positions in space. These types of erroneous animations reduce the fidelity of the experience and the immersive nature of the virtual world. Aspects of the disclosure include displacing the elbow along a boundary to prevent various animations described above that reduce the animation fidelity.

In other aspects, various issues exist with tracking motion when a wrist is folded inwards towards a corresponding shoulder. As the wrist approaches the corresponding shoulder, existing IK solutions generally have to rotate the arm position to an angle that is anatomically not possible, which reduces the fidelity of the experience. Aspects of the disclosure include identifying regions of the human body that use compound motion, or motion of two or more body parts, to perform the motion and increase the animation fidelity. In one aspect, an inwardly folded shoulder may move based on rotation of the arm rather than further angular rotation of the arm.

Figure 6:
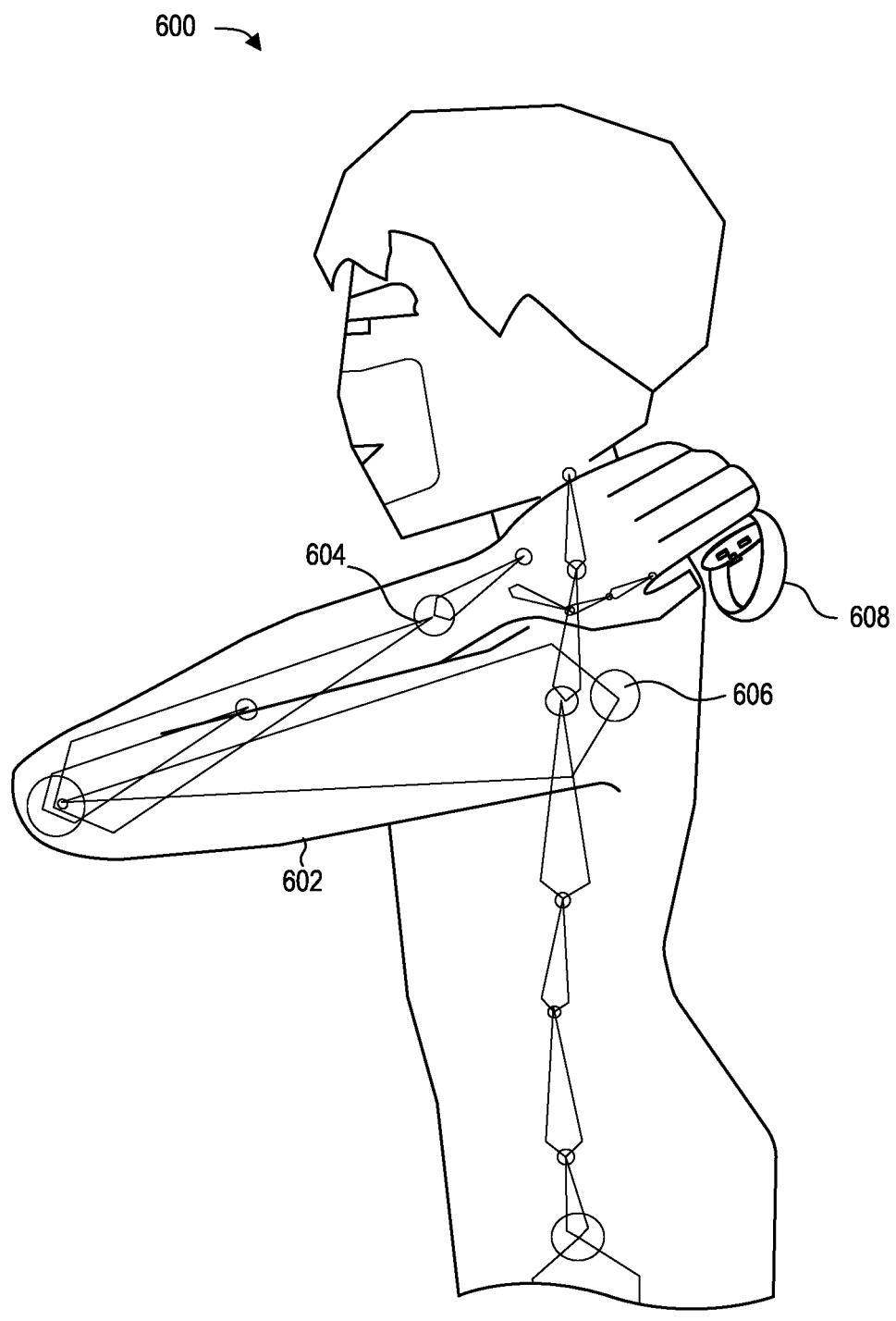
FIG. 6 illustrates an example avatar in the virtual world with a folded arm in accordance with some aspects of the disclosure.

FIG. 6 illustrates an example avatar in the virtual world with a folded arm in accordance with some aspects of the disclosure. In particular, an avatar 600 has a left arm 602 that is folded so that a wrist 604 of the avatar 600 is proximate to a shoulder 606. In this case, the avatar 600 is depicted to include a VR controller 608 having a motion sensor and its corresponding position within the physical world. The VR controller is configured to approximate a position and orientation of a wrist of the avatar 600.

In this case, the mobility of the shoulder 606 can be substantially affected by any further motion of the wrist 604. As the wrist 604 approaches the shoulder 606, the wrist movement and the shoulder movement can be correlated based on further translational movement of the wrist. For example, if the wrist 604 moves upwards when the arm is inwardly folded and the wrist 604 is proximate to the shoulder 606, movement of the wrist 604 can be directly related to the translational movement of the shoulder 606. For example, if the wrist 604 is further moved backward, which is possible based on human anatomy, the shoulder 606 may also rotate and move backward. In this case, compound movement of the arm and shoulder may occur once the wrist enters within a zone associated with the shoulder.

Figure 7:
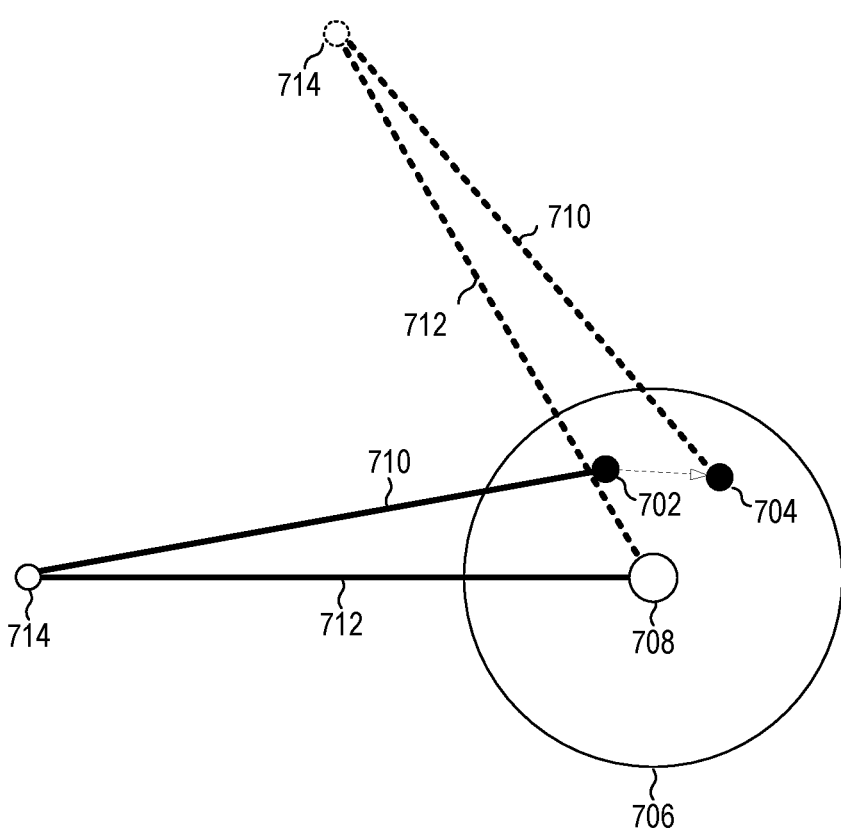
FIG. 7 is a graph that illustrates movement of an inverse kinematic (IK) solution based on an inwardly folded arm in accordance with some aspects of the disclosure.

FIG. 7 is a graph that illustrates movement of an IK solution based on an inwardly folded arm in accordance with some aspects of the disclosure. In this aspect, an effector of a user having at least one motion controller (e.g., a VR controller held by the hand of the user) is detected in the physical world and motion is mapped to an avatar within the virtual world.

In some aspects, the effector (e.g., a joint that is associated with a VR controller such as a wrist) is initially at point 702, which is within a zone 706 of the shoulder 708 associated with the compound motion. In this case, the effector is associated with the wrist and the forearm 710, and the forearm 710 is inwardly folded onto the humerus 712, causing an angle between the forearm 710 and the humerus 712 to be acute.

The forearm 710 is inwardly and collapsed onto the shoulder 708 and no further and the forearm at point 704 is unable to physically rotate toward the humerus. If further motion of an effector (e.g., a VR controller) is detected and moves the effector to point 704, an IK solution determines that the humerus 712 further rotates upward because the forearm 710 and the humerus 712 are fixed lengths. In some aspects, the effector is a joint or another physical asset such as a bone that is tracked and mapped into the virtual world. For example, the motion sensor may be attached to the humerus of the user, which can be used to track arm bone (e.g., the effector) and deduce a shoulder and elbow position. In some cases, the motion sensor may be proximate to the point of interest. For example, a motion sensor in a VR controller may be able to map multiple motion sensors to a single point that approximates a joint (e.g., a wrist joint).

As illustrated in FIG. 7, the rotation of the humerus may physically be impossible. For example, pure shoulder rotation is generally limited to approximately 15° above parallel, and the rotation in FIG. 7 is greater than 45°. This movement is also incorrect because the shoulder is capable of translation and rotation in 3D space. In another example, the bend angle of the humerus may be known, for example, due to an arm sensor on the user's arm). A known bend angle of the humerus would prevent the IK solution from rotating the humerus as shown in FIG. 7. If the bend angle of the humerus is known, the humerus and forearm lengths are fixed and the IK solution may render the movement by separating the joints of the avatar. For example, when the IK solution moves the wrist toward point 702, the avatar's hand may detach from the wrist joint. A wrist joint cannot be detachably separated from the human body, and this animation lowers the fidelity of the rendered animation.

Systems and techniques may configure a compound motion based on the wrist motion that causes the shoulder to move in a realistic and physically accurate manner. For example, the shoulder can be displaced to rotate the shoulder backward, creating an accurate depiction of motion within a virtual world.

Figure 8A:
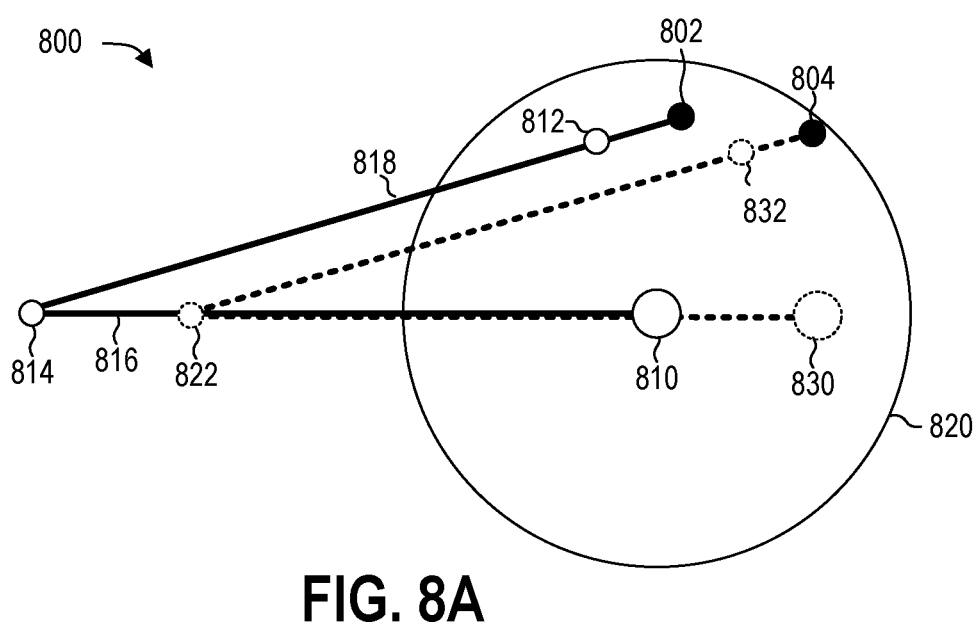
FIGS. 8A and 8B are graphs that illustrate tracking motion based on motion correlation in accordance with some aspects of the disclosure.
Figure 8B:
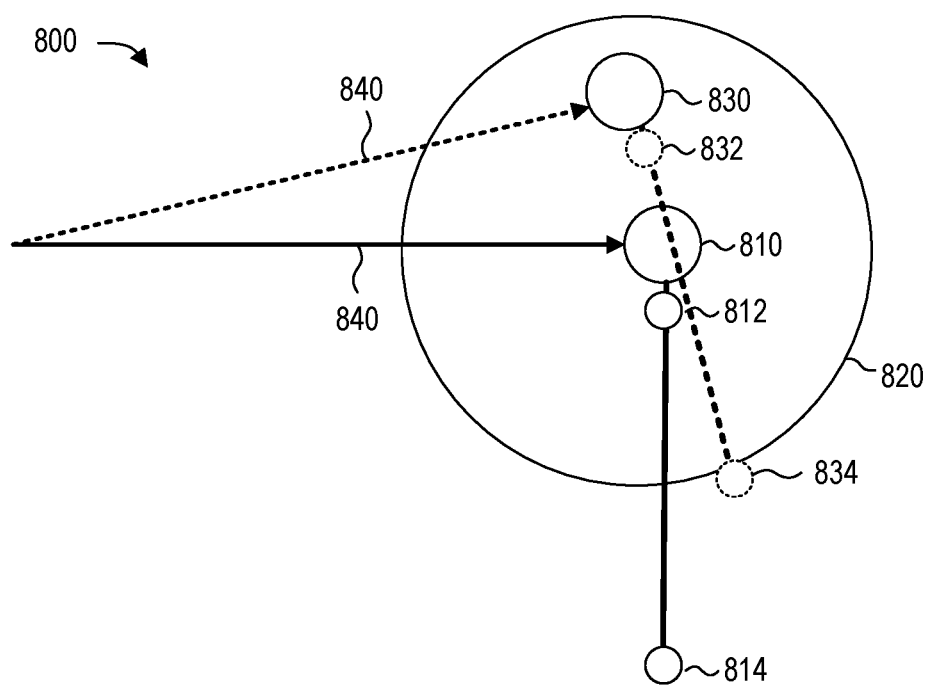

FIGS. 8A and 8B are graphs that illustrate tracking motion based on motion correlation in accordance with some aspects of the disclosure. In some aspects, motion associated with a joint may be correlated to positioning of a body feature (e.g., a joint, a limb, etc.) within a zone proximate to that joint, which may cause compound movement of two or more body features. For example, a wrist (or a VR controller) that is placed within a zone that is proximate to a shoulder can further move based on biasing another joint such as the shoulder 806.

FIGS. 8A and 8B illustrate a method to determine a pose of a limb based on when the limb is biased in accordance with some aspects of the disclosure. In some aspects, a pose comprises a position of one or more limbs connected to one or more joints within a 3D coordinate system (e.g., a 3D space). A pose may be solved based on at least one data point that is provided to the system, such as a location of a wrist and a bend angle of a humerus (e.g., arm). An example system may determine a position of the various joints and bones within the 3D space based on a previous location and the input data. FIG. 8A illustrates a side view of an arm 800 that is positioned based on an effector, and FIG. 8B illustrates a top view of the arm 800. Initially, the effector is positioned at point 802 and moves toward point 804, which corresponds to the motion illustrated in the example of FIG. 7. The points 802 and 804 are not illustrated in FIG. 8B to prevent obscuring more pertinent details.

As noted above with reference to FIG. 7, the IK solution forces the arm 800 to rotate upward into an unnatural position based on the movement from point 802 to point 804. In FIG. 8A, a shoulder is positioned at point 810, and positions of a wrist at point 812 and an elbow at point 814 can be determined based on a bend direction of the humerus 816, the length of a humerus 816 and a length of a forearm 818.

In some aspects, when the wrist is inwardly folded onto the shoulder as illustrated in FIG. 8A, the motion of the wrist based on proximity to the shoulder may induce the shoulder to move. For example, in FIG. 8A, the wrist is fully collapsed inward onto the shoulder, with no further bending of arm possible if the avatar is stationary. In the case the avatar is stationary, any motion of the wrist is associated with movement of a shoulder joint, In some aspects, as illustrated in FIG. 8A, the systems, and techniques may cause the shoulder to rotate from point 810 to point 830. FIG. 8B illustrates a top view of the arm 800 and shows a shoulder bone 840 connecting a center point of an avatar to the shoulder at point 810. In this case, when the effector moves from point 802 to 804, the shoulder bone 840 rotates to point at point 830, which causes the humerus 816 and the forearm 818 (not labeled in FIG. 8B for clarity) to rotate and move backward. In this case, the wrist moves from point 812 to point 832, and the elbow moves from point 814 to point 834.

Based on rotation of the shoulder bone 840, the bend direction of the humerus may remain unchanged. However, according to various aspects, the illustrated example illustrates movement of the shoulder in one axis for purposes of clarity. A shoulder rotates on an axis and is capable of translation in the 3D space, for example moving upwards. In some aspects, the systems and techniques can also cause the shoulder to rotate, which can cause some rotation of the humerus.

Figure 8C:
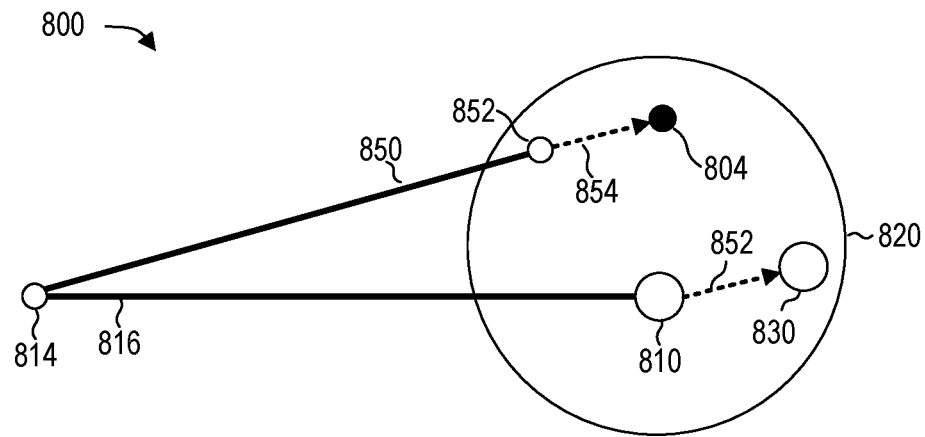
FIG. 8C illustrates a graph of a method for determining rotation of a joint based on biasing of a limb in accordance with some aspects of the disclosure.

FIG. 8C illustrates a graph of a method for determining rotation of a joint based on biasing of a limb in accordance with some aspects of the disclosure. As described above, the effector has moved to point 804 and a bend angle of the humerus 816, a length of the humerus 816, and a length of the forearm 818 are known. In this case, the position of the wrist cannot be adjusted to correspond to the point 804 of the effector and, in some cases, the avatar may be rendered by separating the wrist in the virtual world from the arm.

In some aspects, based on the bend angle of the humerus 816, a vector 850 is identified from the point 814 of the elbow to the location of the effector at point 804. A point 852 is determined on the vector 850 based on a length of the forearm 818, which represents a position of a wrist. After the point 852 is identified, a vector 854 from point 852 to the point 804 is identified. In some aspects, the vector 854 is applied to move the shoulder from point 810 to point 830, which causes the arm and all points associated with the arm to move. For example, the point 852, which corresponds to the wrist, moves to point 804 when the position of the shoulder at point is moved based on the vector 854.

In some aspects, the vector 854 can be a pure translational movement with all points moving the amount corresponding to vector 854. In some other aspects, the vector 854 may cause some biasing, such as causing the shoulder to rotate. For example, the vector 854 may cause the humerus to bend a small amount, but a small amount of rotation can affect other points based on the radius of the vector 850. In this case, the shoulder can be projected to move along the vector 854, and the systems and techniques herein can identify a point that causes the point 852 to be substantially proximate to the point 804.

In some aspects, the vector 854 can also be applied to the point 810 in different manners. In one aspect, the vector 854 is applied to the point 810 as illustrated in FIG. 8C. In other aspects, the vector can be applied to be normal to a neutral position of a shoulder, or normal to the humerus. In this case, the systems and techniques can project a vector from an elbow at point 814 until the vector intersects with or is deemed to intersect with the point 804 within the 3D coordinate system.

As described above, when the effector is located within the zone 820, the systems and techniques may determine a position of the shoulder by rotating the shoulder bone 840 to move from point 810 to point 830. Once the movement of the shoulder bone 840 is identified, the movement is then applied to the avatar in the virtual world. In some aspects, the movement of the wrist from point 802 to point 804 is performed at least in part by rotating the shoulder joint, but other types of rotation can be included such as further rotation of the humerus, etc.

In some aspects, the systems and techniques may also determine a final limb pose based on two different poses and an interpolation or other blending of the two different poses. For example, a first pose of the limb can be determined by a current IK solution, a second pose of the limb can be determined by the techniques described above and further described in FIG. 9. In this example, a final pose can be determined by blending the first pose and second pose based on a position of effector within the zone 820. For example, when the effector is located at a circumferential edge of the zone 820, the first pose can be provided greater weight, and when the effector moves closer to the center of the zone 820, the second pose can be provided greater weight.

Figure 9:
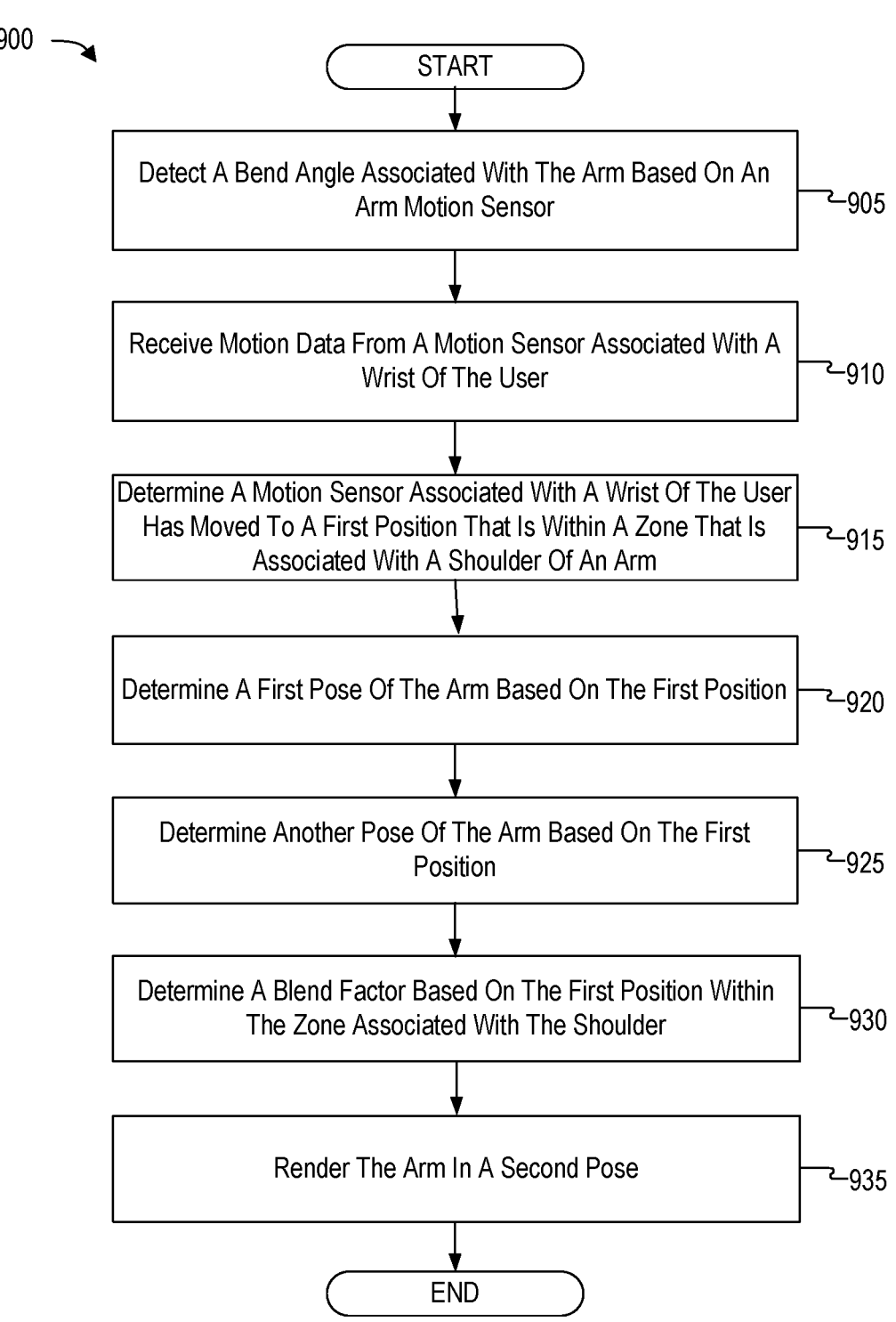
FIG. 9 illustrates another example method for tracking and rendering motion within a virtual world in accordance with some aspects of the disclosure.

FIG. 9 illustrates an example method 900 for tracking and rendering motion within a virtual world in accordance with some aspects of the disclosure. In one aspect, the method 900 can track motion of limbs based on motion correlation in accordance with some aspects of the disclosure. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

The method 900 may be performed by a software application executing on a hardware device, which can also be referred to as an XR device that provides VR or AR content. For example, the software application may be an XR multiuser application that is executing on an HMD, such as a VR headset, or AR glasses. In other aspects, the software application may be executed on a host computer and provided to the XR device. The software application may also be executed on a mobile device, or another device that includes a computing system (e.g., computing system 1300) and is capable of rendering graphics and either displaying the graphics or providing the graphics to another device to display. Based on the input motion using a controller such as an XR controller, the HMD device may be configured to render the motion of an avatar within the XR multiuser application and display the motion to the wearer.

In some aspects, the XR device may detect a bend angle associated with the arm based on an arm motion sensor at block 905. For example, an arm sensor attached to the user may transmit motion data, which the XR device can use to determine a rotation of the arm (e.g., the humerus) with respect to a chest vector of the user. The chest vector is a normalized vector that provides a reference to identify various features, such as the rotation of the humerus when the user is standing or lying down.

The XR device may also receive motion data from a motion sensor associated with a wrist of the user at block 910. In one example, the motion sensor can be an VR controller that is held in the user's hand for performing motion input and other controller-based input (e.g., joysticks, etc.).

The XR device may determine that a motion sensor associated with a wrist of the user has moved to a first position within a zone that is associated with a shoulder of an arm at block 915. For example, a user is standing vertical and has rotated their wrist (and corresponding VR controller) as illustrated in FIG. 6, causing the wrist to collapse onto the shoulder.

In some aspects, the XR device may determine a first pose of the arm based on the first position at block 920. For example, the XR device can use a conventional IK solution to solve the various positions of the elbow and so forth based on the wrist being located at the first position.

At block 925, the XR device may determine another pose of the arm. In some aspects, the other pose may be determined based on the first position being within the zone associated with the shoulder. In one aspect, the XR device is configured to determine an offset associated with a bend angle of the arm and the first position. For example, an elbow is presumed to be positioned in space based on the bend angle and a known length of a humerus, and a vector from the presumed elbow position to the first position is determined. A position of a wrist joint is identified on the vector based on a known length of the forearm of the user, and an offset vector is identified from the wrist joint to the first position.

In some aspects, the offset vector is applied to the shoulder joint to move the shoulder in space, which may cause the wrist joint along the vector to correspond to the first position. As described above, other variations are possible, such as performing a sweep based on a complex rotation in 3D space until the offset vector intersects or ends proximate to the first position. In one example, the offset corresponds to the first position when an endpoint of the offset is positioned at the first position. In another example, the offset corresponds to the first position when the offset intersects the first position.

Based on the offset, the XR device may determine a rotation of a shoulder bone associated with the arm based on the first position associated with the motion sensor and the bend angle associated with the arm. For example, the XR device can maintain the bend angle of the arm and rotate the shoulder bone until the shoulder joint intersects or is proximate to the end point of the offset vector. In this aspect, the XR device determines the position of the elbow and shoulder jointly and identifies another pose of the arm.

At block 930, the XR devices determines a blend factor based on the first position within the zone associated with the shoulder at block 930. In one aspect, the blend factor is based on a location within the zone, with a lower blend factor being associated with a larger radius within the zone.

At block 935, the XR device renders the arm in a second pose at block 935. In one aspect, the second pose of the arm is based on the first pose of the arm and the first position within the zone associated with the shoulder of the arm. For example, the second pose can be determined based on interpolating the first pose with the other pose determined from the shoulder rotation.

As described above, there are numerous issues with tracking motion and providing a high-fidelity experience when a shoulder is folded inwards towards a corresponding shoulder. As the wrist approaches the corresponding shoulder, existing IK solutions generally have to rotate the arm position to an angle that is anatomically not possible, which reduces the fidelity of the experience. Aspects of the disclosure include displacing the elbow along a boundary to prevent various animations described above that reduce the animation fidelity. In one aspect, the XR device blends an IK solution with a motion correlation zone that correlates position of the limb to motion of a corresponding joint. As the motion moves within the zone, the joint performs increased mobility.

In some cases, users of the virtual world have identified various poses in a secondary IK solution that are preferred over a primary IK implementation. In one aspect, the primary IK solution may render the elbow in a position that the user finds unsatisfactory because the pose may be tied to a secondary IK solution (e.g., a previous IK solution) and effects that are triggered within the virtual world in a pose from the secondary IK solution. For example, a user may want to invoke a secondary IK solution that raises the elbow to chest level based on crossing a hand in front of the body to an opposing shoulder, whereas the elbow is rotated 15° downward in the primary IK solution. Aspects of the disclosure include a hybrid IK solution that blends between the primary IK solution and a secondary IK solution based on proximity to a feature associated with the user or avatar. In some aspects, the XR device may monitor a position of an effector to determine whether to trigger the hybrid IK solution. For example, the XR device may use a primary IK solution to determine a first pose based on the motion by default. When the effector moves into a zone, the XR device may determine the first pose and determine a second pose using a secondary IK solution. In some aspects, the first pose and the second pose may be blended based on a position of the effector within the zone.

Figure 10:
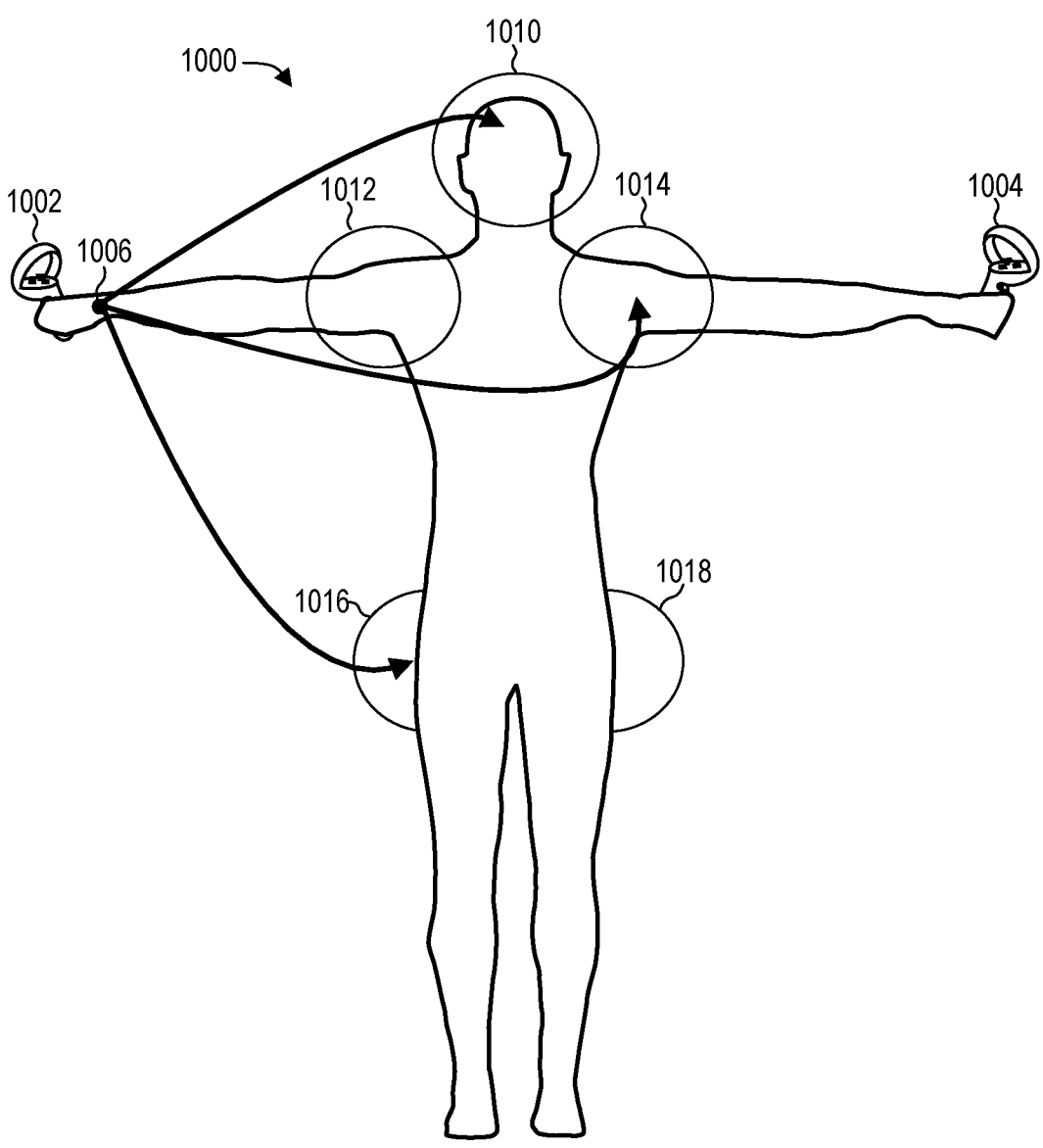
FIG. 10 illustrates an example of a hybrid IK solution based on proximity to zones in accordance with some aspects of the disclosure.

FIG. 10 illustrates an example of a hybrid IK solution based on proximity to zones in accordance with some aspects of the disclosure. In particular, FIG. 10 illustrates a person 1000 holding a right VR controller 1002 and a left VR controller 1004. A secondary IK solution may be activated when the right VR controller 1002 or the left VR controller 1004 enters a designated zone associated with the person 1000. Non-limiting examples of designated zones include a head zone 1010, a right shoulder zone 1012, a left shoulder zone 1014, a right hip zone 1016, and a left hip zone 1018, and further zones are possible. According to some examples, the various zones can be configured by users. For example, a user may configure a knee or foot zone.

In some cases, the zones 1010-1018 may also be designated for a directional mode based on a position of the VR controller. For example, the left hip zone 1018 may be configured to trigger the hybrid IK solution when a left VR controller 1004 is in a forward directional mode, but not in the reverse directional mode.

Figure 11A:
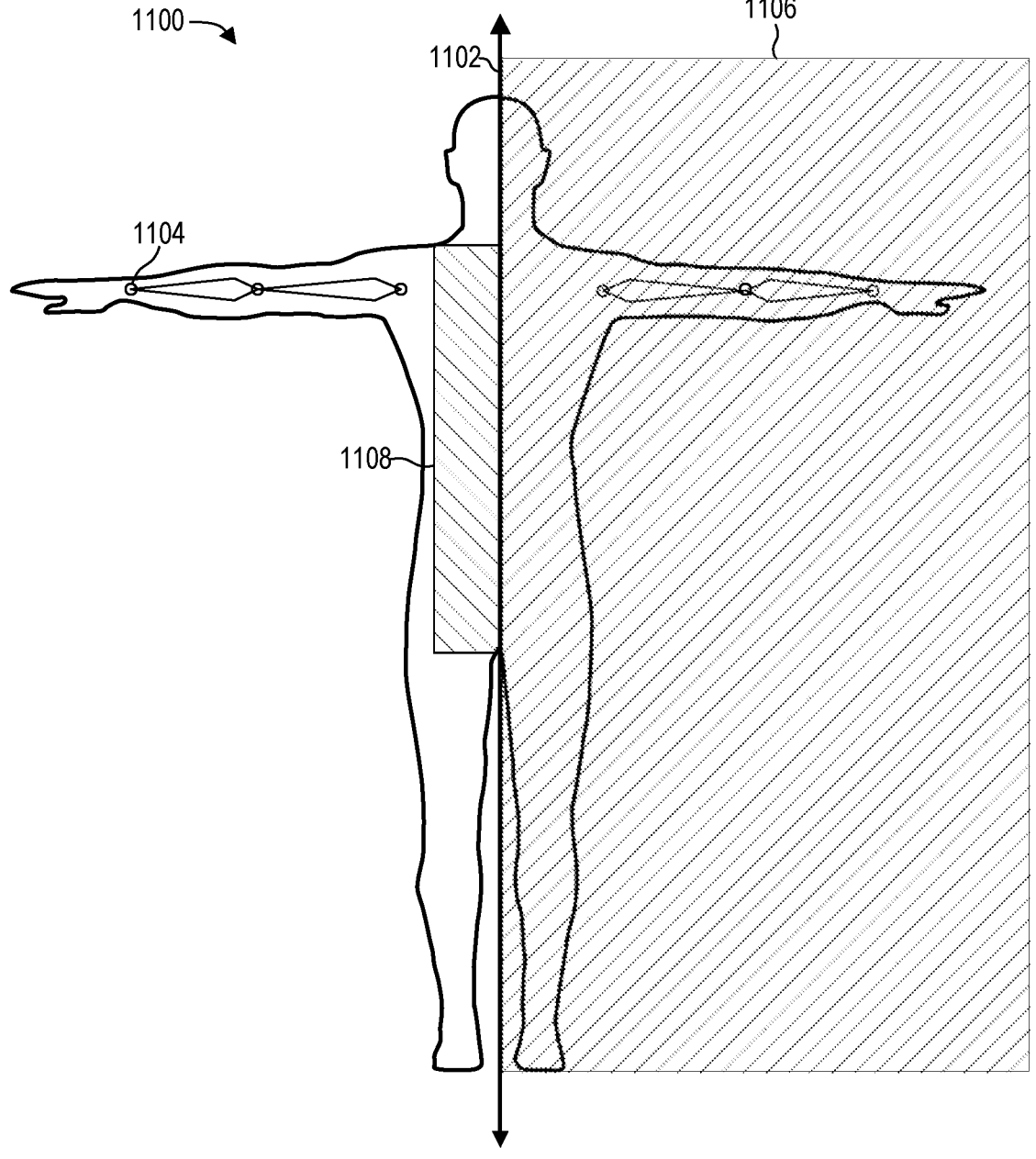
FIG. 11A illustrates an example of regions where an effector is unable to change directional mode in accordance with some aspects of the disclosure.
Figure 11B:
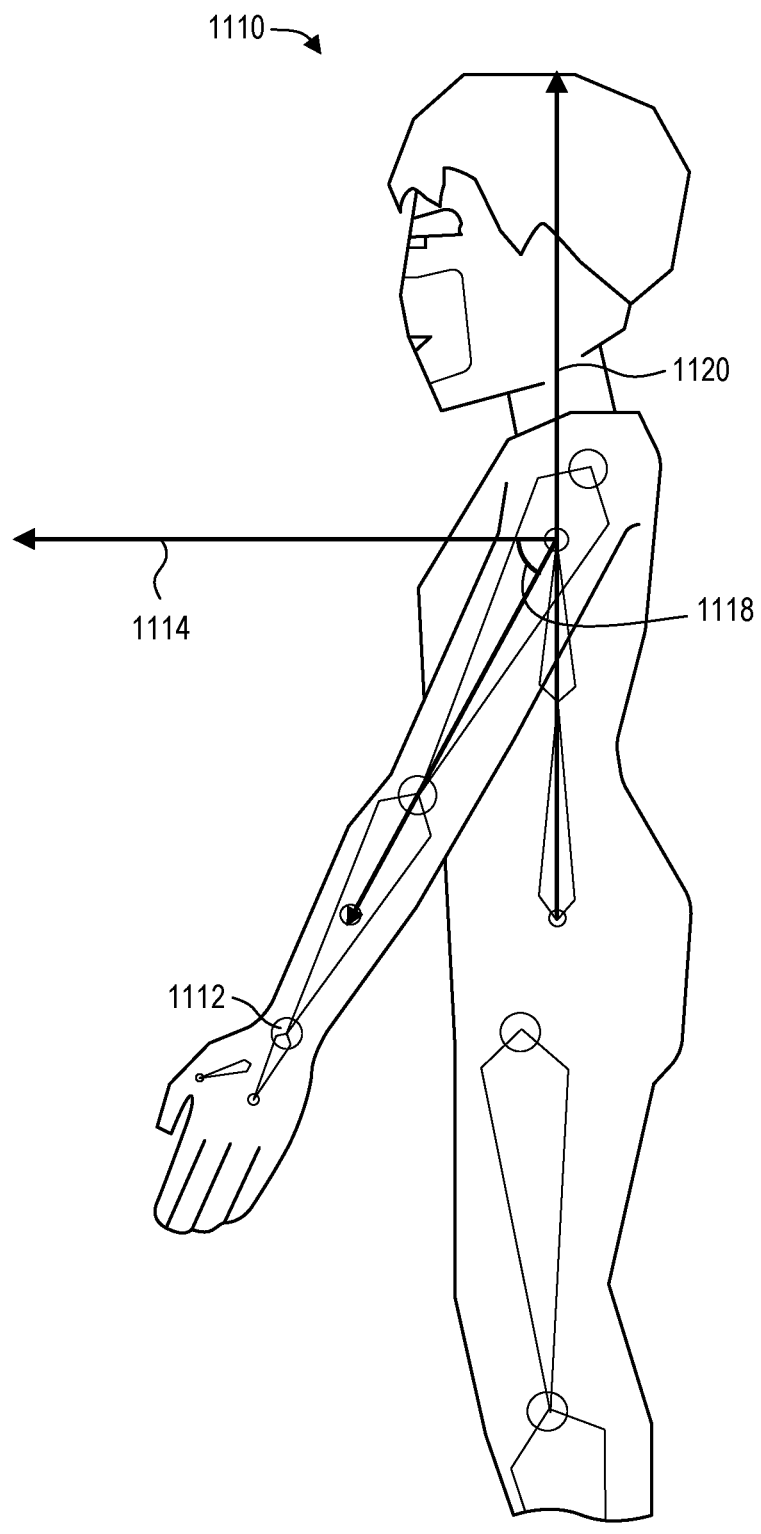
FIG. 11B illustrates an example of a reference vector for configuring a directional mode associated with an effector in accordance with some aspects of the disclosure.

A directional mode is based on a limb associated with the VR controller being located in front of the body or behind the body. For example, when the right VR controller 1002 crosses in front of the person to the left hip zone 1018, the right VR controller 1002 is designated in the forward directional mode. Even if the right VR controller 1002 crosses behind a reference line or a reference plane that changes the directional mode of the left side of the person, the right VR controller 1002 will remain in the forward directional mode because the elbow that drives motion of the right VR controller 1002 is in front of the reference line or reference plane. An example of regions where an effector is unable to change directional mode is illustrated in FIG. 11A and an example of reference line or reference plane are illustrated in FIG. 11B.

An effector is configured to trigger a dual IK solution using a primary IK solution and at least one secondary IK solution. For example, the effector may correspond to the wrist joint 1006 based on a calibration of the right VR controller 1002. In this example, the person 1000 has configured a head zone 1010, a right hip zone 1016, and a left shoulder zone 1014 to trigger the secondary IK solution when the wrist joint 1006 enters one of the head zone 1010, right hip zone 1016, and the left shoulder zone 1014. In one example, an effector of the user enters the left shoulder zone, and the systems and techniques invoke a dual IK solution to determine the pose of the user within the virtual world. In another example, if the effector of the user enters the left hip zone 1018, the systems and technique maintain rendering of the avatar within the virtual world based on the primary IK solution.

When the dual IK solution is invoked, the systems and technique determine a first pose using the primary IK solution and a second pose based on the secondary IK solution. A final pose may be determined based on blending the first pose and the second pose. In one aspect, the blending of the first pose and the second pose is based on a blend factor. The blend factor may be associated with a position of the effector (e.g., the wrist joint 1006) within a corresponding zone. In this case, as the effector moves toward a target region of the zone, the first pose is fully blended out (e.g., not used in the rendering) and the final pose corresponds to the second pose determined by the secondary IK solution. The systems and techniques allow a user to customize their animations based on different IK solutions. Although only a single secondary IK solution is described, the zones may be associated with different secondary IK solutions, and may include various other parameters that can be customized to control the rendering of the second pose.

In some aspects, the various zones may be based on a person in the physical world, or an avatar in the virtual world. For example, a position of the zones, a radius of the zones, and so forth may be determined based on a user's physical information (e.g., height). In another example, the various zones may also be configured based on the avatar's dimensions in the virtual world.

FIG. 11A illustrates an example of regions where an effector is unable to change the directional mode in accordance with some aspects of the disclosure. In the example illustrated in FIG. 11A, a person 1100 is positioned as a T-pose for illustrative purposes, and a centerline 1102 divides a right side of the person 1100 from a left side of the person 1100. In some aspects, a position of an effector such as the wrist joint 1104 is monitored and prevented from switching direction mode when the effector crosses the centerline 1102 to an opposing side as denoted by region 1106. In some aspects, the VR controller is also prevented from switching directional mode based on a body region 1108 on the same side as the effector. In this case, the body region 1108 is a solid geometry, and switching directional mode would cause the arm to intersect with the torso.

In this case, the head region of the person 1100 may be permitted to switch directional modes because the mobility of the head may permit the effector to cross a plane that changes the directional mode. According to various aspects, the direction mode cannot be switched because of a solid region (e.g., body region 1108) and a limited mobility region (e.g., region 1106).

FIG. 11B illustrates an example of a reference vector for configuring a directional mode associated with an effector in accordance with some aspects of the disclosure. In particular, FIG. 11B illustrates a side view of an avatar 1110 and a wrist joint 1112 that is mapped to an effector in the physical world. A reference vector 1114 is illustrated that identifies an orientation of the avatar 1110. In one aspect, the reference vector 1114 may be associated with a spine of the user and is normal to a plane that divides frontal region and a back region of the avatar 1110. An effector in front of the reference vector 1114 is in the forward directional mode, and an effector behind the reference vector 1114 is in the reverse directional mode. In this case, the arm of the avatar 1110 is forwardly rotated by a bend angle 1118 and the wrist joint 1112 corresponding to an effector is in the forward directional mode.

As described above, the directional mode may be considered to trigger the hybrid IK solution. For example, when the arm of the user is in the reverse directional mode and the wrist is proximate to the an opposite hit, the hybrid IK solution would not be invoked.

In another illustrative aspect, the reference vector 1120 may correspond to a spine of the avatar 1110. In this case, the effector may be in forward directional mode or reverse directional mode based on a position relative to a plane defined by the reference vector 1120. For example, an effector in front (e.g. to the left) of the reference vector 1120 is in the forward directional mode, and an effector behind (e.g., to the right) the reference vector 1120 is in the reverse directional mode.

FIG. 12 illustrates an example method 1200 for tracking and rendering motion within a virtual world in accordance with some aspects of the disclosure. Although the example method 1200 depicts a particular sequence of operations, the sequence may be altered without departing from the scope of the present disclosure. For example, some of the operations depicted may be performed in parallel or in a different sequence that does not materially affect the function of the method 1200. In other examples, different components of an example device or system that implements the method 1200 may perform functions at substantially the same time or in a specific sequence.

The method 1200 may be performed by a software application executing on a hardware device, which can also be referred to as an XR device that provides VR or AR content. For example, the software application may be an XR multiuser application that is executing on an HMD, such as a VR headset, or AR glasses. In other aspects, the software application may be executed on a host computer and provided to the XR device. The software application may also be executed on a mobile device, or another device that includes a computing system (e.g., computing system 1300) and is capable of rendering graphics and either displaying the graphics or providing the graphics to another device to display. Based on the input motion using a controller such as an XR controller, the HMD device may be configured to render the motion of an avatar within the XR multiuser application and display the motion to the wearer.

At block 1205, the XR device may detect motion of a motion sensor provided by a user to animate an avatar of the user in a virtual world. In one aspect, the motion sensor is associated with an effector that binds motion information from the motion sensor into the virtual world. For example, the motion sensor can be a VR controller that provides information that can be mapped to a wrist of the user, with the wrist joint corresponding to the effector. In another example, the effector can be a watch including a motion sensor, and can be mapped to the wrist of the user.

At block 1210, the XR device may determine a first pose of at least one limb of the avatar using a first technique at block 1210. In one illustrative example, the first technique comprises a first IK solution to position the at least one limb in the virtual world.

At block 1215, the XR device may, based at least on a position of the effector within a zone, determine a second pose of the at least one limb of the avatar using a second technique at block 1215. In some aspects, the second technique may be a different IK technique that has a desired effect (e.g., pose) that is preferred by a user. In some aspects, the zone may be proximate to a part, such as a hip joint or a shoulder joint, and cause the XR device to invoke the second technique. As noted above, users may have preference over some poses in one or more different IK solutions.

In some aspects, the second technique associated with block 1215 may include determining at least one property of the zone. Illustrative examples of a property of the zone includess a location, a size, a shape, and a radius of the zone. In some cases, the at least one property of the zone may be based on physical information of the avatar, such as a height of the avatar, or a distance from a hip joint to a reference point. An illustrative example of a reference point includes the eyes.

In one aspect of block 1215, the XR device may determine a directional mode of the effector. In some cases, the second IK technique may not be invoked based on the body part associated with the effector, and a directional mode can be used to track the position of the effector as being in front or behind to prevent incorrect invocation of the second technique. For example, the second IK technique may be invoked when a hand crosses to an opposite hip, but may be invoked when the hand crosses to an opposite elbow.

The directional mode includes a forward directional mode and a reverse directional mode relative to an orientation of a chest vector. An example of a reference vector is a chest vector, which may be a center line of a user's body, or a normal vector that extends parallel to the ground and normal to the chest. When the effector is in front of the reference vector, the effector is in the forward directional mode and, when the effector is behind the reference vector, the effector is behind the chest vector, the effector is in the reverse directional mode. For example, when a user rotates a fully extended arm holding a VR controller toward their back, the VR controller is deemed reverse directional mode. An example of a forward directional mode is when the user is holding the VR controller in front of their chest.

In some aspects, at block 1215, the XR device may determine whether the effector is permitted to switch the directional mode based on the position of the effector with respect to a defined region associated with a body. For example, if the VR controller is located at a center chest point, the VR controller is not permitted to switch into reverse directional mode because the physical body blocks movement of the VR controller. In some cases, the directional mode cannot be switched based on human anatomy. For example, if the effector extends in front of the torso to an opposing hip and the effector is placed behind the reference vector, the effector is not permitted to switch directional modes because a corresponding elbow is blocked by the torso. As described above, the blocking region prevents a part of a limb from crossing a solid region in the virtual world, thereby preserving the effector in the correct state ad preventing animations that would clip the solid region in the virtual world.

At block 1220, the XR device may render the at least one limb of the avatar based on the first pose and the second pose. In one aspect, the tendering the at least one limb of the avatar is based on the first pose and the second pose comprises interpolating the first pose and the second pose based on the blend factor to yield a third pose. As described above, the position within the zone is correlated to the blend factor. For example, XR device at block 1220 may determine a blend factor based on the position of the effector within the zone.

According to various aspects, the XR device can be configured to activate two or more IK solutions and animate an avatar based on motion input by the user. The directional mode is determined to ensure that the animation can be input based on a solid region within the virtual world and prevents clipping of motion from a joint, limb, or other aspect of the avatar.

Figure 13:
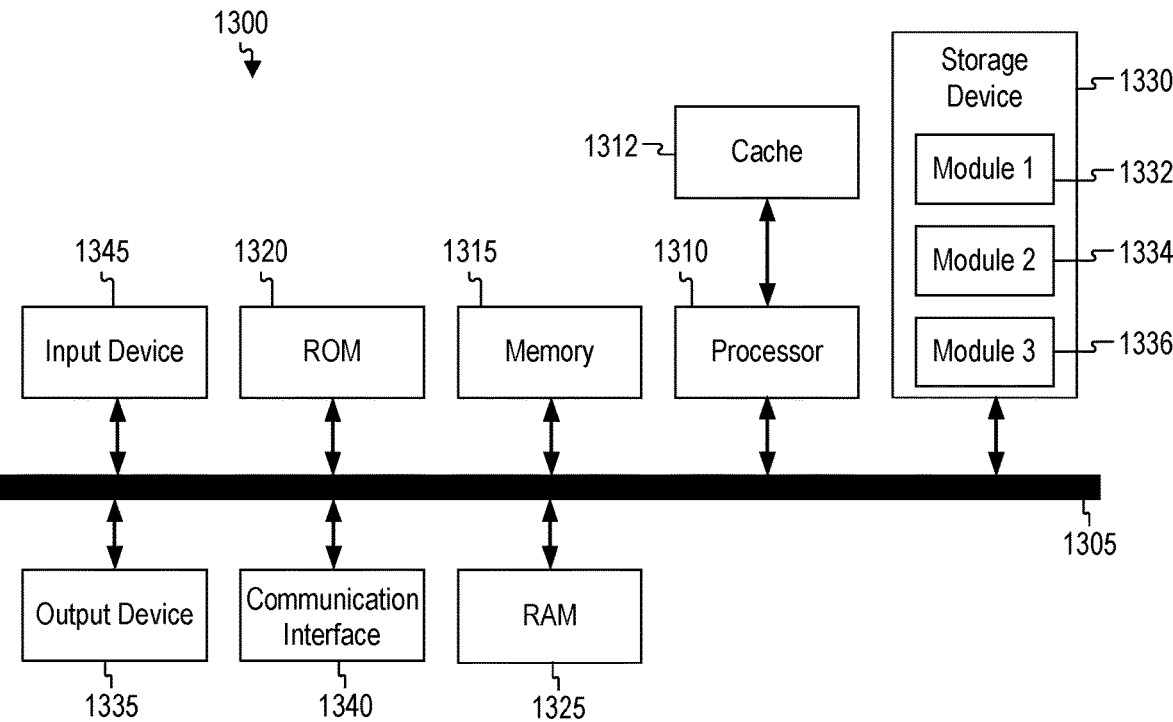
FIG. 13 shows an example of a system for implementing certain aspects of the present technology.

FIG. 13 shows an example of computing system 1300, which can be for example any computing device that part of an XR system, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement, and therefore the basic features here may easily be substituted for improved hardware or firmware arrangements as they are developed.

Storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative Aspects of the Disclosure Include

Aspect 1. A method of tracking and rendering motion within a virtual world, comprising: determining a position of a first elbow associated with an arm of an avatar in the virtual world based on at least a position associated with a wrist or hand of a user; determining whether the position of the elbow is inside a boundary associated with an opposing shoulder; adjusting the position of the elbow to be outside of the boundary associated with the opposing shoulder; and rendering the arm of the avatar based on the position of the elbow outside of the boundary.

Aspect 2. The method of Aspect 1, wherein the adjusting of the position comprises calculating the position of the elbow to follow the boundary.

Aspect 3. The method of any of Aspects 1 to 2, wherein the boundary comprises a non-linear region that is associated with the opposing shoulder.

Aspect 4. The method of any of Aspects 1 to 3, wherein the non-linear region comprises a curved region having at least one origin located at the opposing shoulder.

Aspect 5. A method of tracking and rendering motion within a virtual world, comprising: receiving motion data from a motion sensor associated with a wrist of the user; determining a motion sensor associated with a wrist of the user has moved to a first position that is within a zone that is associated with a shoulder of an arm; determining a first pose of the arm based on the first position; and rendering the arm in a second pose, wherein the second pose of the arm is based on the first pose of the arm and the first position within the zone associated with the shoulder of the arm.

Aspect 6. The method of Aspect 5, further comprising: detecting a bend angle associated with the arm based on at least one of an arm motion sensor or a wrist motion sensor.

Aspect 7. The method of any of Aspects 5 to 6, further comprising: determining a rotation of a shoulder bone associated with the arm based on the first position associated with the motion sensor and the bend angle associated with the arm.

Aspect 8. The method of any of Aspects 5 to 7, further comprising: determining an offset based on the bend angle associated with the arm and the first position associated with the motion sensor; and applying the offset to a shoulder joint associated with the arm.

Aspect 9. The method of any of Aspects 5 to 8, wherein the offset corresponds to the first position when the offset intersects the first position.

Aspect 10. The method of any of Aspects 5 to 9, wherein the offset corresponds to the first position when an end point of the offset is positioned at the first position.

Aspect 11. The method of any of Aspects 5 to 10, wherein the rotation of the shoulder is identified based on the offset applied to the shoulder joint.

Aspect 12. The method of any of Aspects 5 to 11, further comprising: determining a blend factor based on the first position within the zone associated with the shoulder, wherein the second position of the arm is determined based on the first position, a position associated with the rotation of the shoulder bone, and the blend factor.

Aspect 13. A method of tracking and rendering motion within a virtual world, comprising: detecting motion of a motion sensor provided by a user to animate an avatar of the user in a virtual world, wherein the motion sensor is associated with an effector that binds motion information from the motion sensor into the virtual world; determining a first pose of at least one limb of the avatar using a first technique; based at least on a position of the effector within a zone, determining a second pose of the at least one limb of the avatar using a second technique; and rendering the at least one limb of the avatar based on the first pose and the second pose.

Aspect 14. The method of Aspect 13, further comprising: determining at least one property of the zone, wherein the at least one property includes at least one of a location, a size, a shape, and a radius of the zone; determining a position of the effector based on the motion of the motion sensor; and determining whether the position of the effector is located within the zone.

Aspect 15. The method of any of Aspects 13 to 14, wherein the at least one property of the zone is based on physical information of the user.

Aspect 16. The method of any of Aspects 13 to 15, wherein the at least one property of the zone is based on physical information of the avatar.

Aspect 17. The method of any of Aspects 13 to 16, further comprising: determining a directional mode associated with the effector, the directional mode including a forward directional mode and a reverse directional mode relative to an orientation of a reference vector.

Aspect 18. The method of any of Aspects 13 to 17, further comprising: determining whether the effector is permitted to switch the directional mode based on the position of the effector with respect to the reference vector.

Aspect 19. The method of any of Aspects 13 to 18, wherein the directional mode includes a reverse directional mode and a forward directional mode, wherein the effector comprises the forward directional mode when a wrist associated is positioned in front of the reference vector, and the effector comprises the reverse directional mode when the effector is associated with a position behind the reference vector.

Aspect 20. The method of any of Aspects 13 to 19, wherein the determining of the second pose is omitted when the effector is not permitted based on the directional mode.

Aspect 21. The method of any of Aspects 13 to 20, further comprising: determining a blend factor based on the position of the effector within the zone.

Aspect 22. The method of any of Aspects 13 to 21, wherein rendering the at least one limb of the avatar based on the first pose and the second pose comprises interpolating the first pose and the second pose based on the blend factor to yield a third pose.

Aspect 23. The method of any of Aspects 13 to 22, wherein the first technique comprises a first inverse kinematics (IK) solution to position the at least one limb in the virtual world, and the second technique comprises a second IK solution to position the at least one limb in the virtual world.

Aspect 24. An apparatus for tracking motion used in an extended reality application includes a storage (implemented in circuitry) configured to store instructions and a processor. The processor configured to execute the instructions and cause the processor to: determine a position of a first elbow associated with an arm of an avatar in the virtual world based on at least a position associated with a wrist or hand of a user; determining whether the position of the elbow is inside a boundary associated with an opposing shoulder; adjust the position of the elbow to be outside of the boundary associated with the opposing shoulder; and render the arm of the avatar based on the position of the elbow outside of the boundary.

Aspect 25. The apparatus of Aspect 24, wherein the adjusting of the position comprises calculating the position of the elbow to follow the boundary.

Aspect 26. The apparatus of any of Aspects 24 to 25, wherein the boundary comprises a non-linear region that is associated with the opposing shoulder.

Aspect 27. The apparatus of any of Aspects 24 to 26, wherein the non-linear region comprises a curved region having at least one origin located at the opposing shoulder.

Aspect 28. An apparatus for tracking motion used in an extended reality application includes a storage (implemented in circuitry) configured to store instructions and a processor. The processor configured to execute the instructions and cause the processor to: receive motion data from a motion sensor associated with a wrist of the user; determine a motion sensor associated with a wrist of the user has moved to a first position that is within a zone that is associated with a shoulder of an arm; determine a first pose of the arm based on the first position; and render the arm in a second pose, wherein the second pose of the arm is based on the first pose of the arm and the first position within the zone associated with the shoulder of the arm.

Aspect 29. The apparatus of Aspect 28, wherein the processor is configured to execute the instructions and cause the processor to: detect a bend angle associated with the arm based on at least one of an arm motion sensor or a wrist motion sensor.

Aspect 30. The apparatus of any of Aspects 28 to 29, wherein the processor is configured to execute the instructions and cause the processor to: determine a rotation of a shoulder bone associated with the arm based on the first position associated with the motion sensor and the bend angle associated with the arm.

Aspect 31. The apparatus of any of Aspects 28 to 30, wherein the processor is configured to execute the instructions and cause the processor to: determine an offset based on the bend angle associated with the arm and the first position associated with the motion sensor; and apply the offset to a shoulder joint associated with the arm.

Aspect 32. The apparatus of any of Aspects 28 to 31, wherein the offset corresponds to the first position when the offset intersects the first position.

Aspect 33. The apparatus of any of Aspects 28 to 32, wherein the offset corresponds to the first position when an end point of the offset is positioned at the first position.

Aspect 34. The apparatus of any of Aspects 28 to 33, wherein the rotation of the shoulder is identified based on the offset applied to the shoulder joint.

Aspect 35. The apparatus of any of Aspects 28 to 34, wherein the processor is configured to execute the instructions and cause the processor to: determine a blend factor based on the first position within the zone associated with the shoulder, wherein the second position of the arm is determined based on the first position, a position associated with the rotation of the shoulder bone, and the blend factor.

Aspect 36. An apparatus for tracking motion used in an extended reality application includes a storage (implemented in circuitry) configured to store instructions and a processor. The processor configured to execute the instructions and cause the processor to: detect motion of a motion sensor provided by a user to animate an avatar of the user in a virtual world, wherein the motion sensor is associated with an effector that binds motion information from the motion sensor into the virtual world; determine a first pose of at least one limb of the avatar using a first technique; based at least on a position of the effector within a zone, determine a second pose of the at least one limb of the avatar using a second technique; and render the at least one limb of the avatar based on the first pose and the second pose.

Aspect 37. The apparatus of Aspect 36, wherein the processor is configured to execute the instructions and cause the processor to: determine at least one property of the zone, wherein the at least one property includes at least one of a location, a size, a shape, and a radius of the zone; determine a position of the effector based on the motion of the motion sensor; and determining whether the position of the effector is located within the zone.

Aspect 38. The apparatus of any of Aspects 36 to 37, wherein the at least one property of the zone is based on physical information of the user.

Aspect 39. The apparatus of any of Aspects 36 to 38, wherein the at least one property of the zone is based on physical information of the avatar.

Aspect 40. The apparatus of any of Aspects 36 to 39, wherein the processor is configured to execute the instructions and cause the processor to: determine a directional mode associated with the effector, the directional mode including a forward directional mode and a reverse directional mode relative to an orientation of a reference vector.

Aspect 41. The apparatus of any of Aspects 36 to 40, wherein the processor is configured to execute the instructions and cause the processor to: determine whether the effector is permitted to switch the directional mode based on the position of the effector with respect to the reference vector.

Aspect 42. The apparatus of any of Aspects 36 to 41, wherein the directional mode includes a reverse directional mode and a forward directional mode, wherein the effector comprises the forward directional mode when a wrist associated is positioned in front of the reference vector, and the effector comprises the reverse directional mode when the effector is associated with a position behind the reference vector.

Aspect 43. The apparatus of any of Aspects 36 to 42, wherein the determining of the second pose is omitted when the effector is not permitted based on the directional mode.

Aspect 44. The apparatus of any of Aspects 36 to 43, wherein the processor is configured to execute the instructions and cause the processor to: determine a blend factor based on the position of the effector within the zone.

Aspect 45. The apparatus of any of Aspects 36 to 44, wherein rendering the at least one limb of the avatar based on the first pose and the second pose comprises interpolating the first pose and the second pose based on the blend factor to yield a third pose.

Aspect 46. The apparatus of any of Aspects 36 to 45, wherein the first technique comprises a first inverse kinematics (IK) solution to position the at least one limb in the virtual world, and the second technique comprises a second IK solution to position the at least one limb in the virtual world.

Aspect 47. A non-transitory computer-readable medium comprising instructions which, when executed by one or more processors, cause the one or more processors to perform operations according to any of Aspects 1 to 4.

Aspect 48. An apparatus comprising means for performing operations according to any of Aspects 1 to 4.

Aspect 49. A non-transitory computer-readable medium comprising instructions which, when executed by one or more processors, cause the one or more processors to perform operations according to any of Aspects 5 to 12.

Aspect 50. An apparatus comprising means for performing operations according to any of Aspects 5 to 12.

Aspect 51. A non-transitory computer-readable medium comprising instructions which, when executed by one or more processors, cause the one or more processors to perform operations according to any of Aspects 13 to 23.

Aspect 52. An apparatus comprising means for performing operations according to any of Aspects 13 to 23.

What is claimed is:

1. A method of tracking and rendering motion within a virtual world, comprising:

determining a position of a first elbow associated with an arm of an avatar in the virtual world based on at least a position associated with a motion sensor corresponding to a wrist or hand of a user;

determining whether the position of an elbow corresponding to the wrist or the hand is inside a boundary associated with an opposing shoulder;

adjusting the position of the elbow to be outside of the boundary associated with the opposing shoulder while maintaining the position of the wrist or the hand corresponding to the motion sensor; and rendering the arm of the avatar based on the position of the elbow outside of the boundary.

2. The method of claim 1, wherein the adjusting of the position comprises calculating the position of the elbow to follow the boundary.

3. The method of claim 1, wherein the boundary comprises a non-linear region that is associated with the opposing shoulder.

4. The method of claim 3, wherein the non-linear region comprises a curved region having at least one origin located at the opposing shoulder.

5. A method of tracking and rendering motion within a virtual world, comprising:

receiving motion data from a motion sensor associated with a wrist or hand of a user;

determining, based on the motion data, a position of an elbow of an arm corresponding to the wrist or the hand;

determining whether the position of the elbow is within a boundary associated with an opposing shoulder of the arm; and rendering the arm based on the position of the elbow relative to the boundary, wherein the arm is rendered in a pose characterized by a near maximum flexion of the elbow of the arm while maintaining the position of the wrist and rotation of a shoulder of the arm, whereby the arm is rendered without distortion of a length of the arm or unnatural rotation of the elbow.

6. The method of claim 5, further comprising:

detecting a bend angle associated with the arm based on at least one of an arm motion sensor or a wrist motion sensor.

7. The method of claim 6, further comprising:

determining a rotation of a shoulder bone associated with the arm based on a first position associated with the motion sensor and the bend angle associated with the arm.

8. The method of claim 7, further comprising:

determining an offset based on the bend angle associated with the arm and the first position associated with the motion sensor; and applying the offset to a shoulder joint associated with the arm.

9. The method of claim 8, wherein the rotation of the shoulder is identified based on the offset applied to the shoulder joint.

10. The method of claim 8, wherein the offset corresponds to the first position when the offset intersects the first position.

11. The method of claim 8, wherein the offset corresponds to the first position when an end point of the offset is positioned at the first position.

12. The method of claim 7, further comprising:

determining a blend factor based on the first position associated with the shoulder, wherein a second position of the arm is determined based on the first position, a third position associated with the rotation of the shoulder bone, and the blend factor.

13. A method of tracking and rendering motion within a virtual world, comprising:

detecting motion of a motion sensor provided by a user to animate an avatar of the user in a virtual world, wherein the motion sensor is associated with an effector that binds motion information from the motion sensor into the virtual world;

determining a directional mode associated with the effector, the directional mode including a forward directional mode and a reverse directional mode relative to an orientation of a reference vector;

determining a first pose of at least one limb of the avatar using a first technique;

based at least on a position of the effector within a zone, determining a second pose of the at least one limb of the avatar using a second technique; and rendering the at least one limb of the avatar based on the first pose and the second pose.

14. The method of claim 13, further comprising:

determining at least one property of the zone, wherein the at least one property includes at least one of a location, a size, a shape, and a radius of the zone;

determining a position of the effector based on the motion of the motion sensor; and determining whether the position of the effector is located within the zone.

15. The method of claim 14, wherein the at least one property of the zone is based on physical information of the user.

16. The method of claim 14, wherein the at least one property of the zone is based on physical information of the avatar.

17. The method of claim 13, further comprising:

determining whether the effector is permitted to switch the directional mode based on the position of the effector with respect to the reference vector.

18. The method of claim 17, wherein the directional mode includes a reverse directional mode and a forward directional mode, wherein the effector comprises the forward directional mode when a wrist associated is positioned in front of the reference vector, and the effector comprises the reverse directional mode when the effector is associated with a position behind the reference vector.

19. The method of claim 17, wherein the determining of the second pose is omitted when the effector is not permitted based on the directional mode.

20. The method of claim 13, further comprising:

determining a blend factor based on the position of the effector within the zone.

21. The method of claim 20, wherein rendering the at least one limb of the avatar based on the first pose and the second pose comprises interpolating the first pose and the second pose based on the blend factor to yield a third pose.

22. The method of claim 13, wherein the first technique comprises a first inverse kinematics (IK) solution to position the at least one limb in the virtual world, and the second technique comprises a second IK solution to position the at least one limb in the virtual world.

* * * * *